US007412434B1

(12) United States Patent
Klug et al.

(10) Patent No.: US 7,412,434 B1
(45) Date of Patent: *Aug. 12, 2008

(54) WORLD WIDE WEB REGISTRATION INFORMATION PROCESSING SYSTEM

(75) Inventors: John R. Klug, Evergreen, CO (US); Thad D. Peterson, Marietta, GA (US)

(73) Assignee: Registrar Systems LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/032,750

(22) Filed: Jan. 10, 2005

Related U.S. Application Data

(60) Division of application No. 10/411,829, filed on Apr. 10, 2003, now Pat. No. 7,089,224, which is a continuation of application No. 09/884,779, filed on Jun. 19, 2001, now Pat. No. 6,823,327, which is a continuation of application No. 09/128,915, filed on Aug. 4, 1998, now abandoned, which is a continuation of application No. 08/595,837, filed on Feb. 2, 1996, now Pat. No. 5,790,785.

(60) Provisional application No. 60/008,736, filed on Dec. 11, 1995.

(51) Int. Cl.
*G06F 17/30* (2006.01)
(52) U.S. Cl. .................................. 707/1; 726/2; 726/26
(58) Field of Classification Search ................. 707/1–6, 707/9–10, 100–104; 705/1, 14, 44, 64–67; 713/200–202; 235/2–3, 6–7; 709/200–203, 709/223–232

See application file for complete search history.

(56) References Cited

U.S. PATENT DOCUMENTS

| 4,766,293 | A | 8/1988 | Boston |
| 5,001,628 | A | 3/1991 | Johnson et al. |
| 5,235,642 | A | 8/1993 | Wobber et al. |
| 5,241,594 | A | 8/1993 | Kung |
| 5,263,158 | A | 11/1993 | Janis |

(Continued)

FOREIGN PATENT DOCUMENTS

EP    0711090    5/1996

(Continued)

OTHER PUBLICATIONS

"Research Firms Strive for Web Tracking That Counts New Tracking Systems Promise Individual Consumer Portraits", Interactive Marketing News, v2, n13, Jun. 13, 1995.*

(Continued)

*Primary Examiner*—Mary Cheung
(74) *Attorney, Agent, or Firm*—Dorsey & Whitney LLP

(57) ABSTRACT

A World Wide Web registration processing system is disclosed for assisting World Wide Web users in registering at World Wide Web web sites. For each such user, the registration processing system includes a long term repository for the user's web site registration information so that this information can be automatically transferred to a plurality of web sites to which the user may at time to time request to be registered. Further, the registration processing system provides the user with the capability to have a common user identification that may be used for accessing services at a plurality of web sites.

27 Claims, 19 Drawing Sheets

U.S. PATENT DOCUMENTS

| | | | |
|---|---|---|---|
| 5,375,240 A * | 12/1994 | Grundy | 726/28 |
| 5,455,953 A | 10/1995 | Russell | |
| 5,469,576 A | 11/1995 | Dauerer et al. | |
| 5,481,720 A | 1/1996 | Loucks et al. | |
| 5,506,961 A | 4/1996 | Carlson et al. | |
| 5,515,490 A | 5/1996 | Buchanan et al. | |
| 5,544,322 A | 8/1996 | Cheng et al. | |
| 5,572,643 A | 11/1996 | Judson | |
| 5,586,260 A | 12/1996 | Hu | |
| 5,590,197 A | 12/1996 | Chen et al. | |
| 5,604,490 A | 2/1997 | Blakley, III et al. | |
| 5,604,542 A | 2/1997 | Dedrick | |
| 5,611,048 A | 3/1997 | Jacobs et al. | |
| 5,619,574 A | 4/1997 | Johnson et al. | |
| 5,627,886 A | 5/1997 | Bowman | |
| 5,642,515 A | 6/1997 | Jones et al. | |
| 5,647,450 A | 7/1997 | Ogawa et al. | |
| 5,657,450 A | 8/1997 | Rao et al. | |
| 5,671,354 A | 9/1997 | Ito et al. | |
| 5,678,041 A * | 10/1997 | Baker et al. | 707/9 |
| 5,682,428 A | 10/1997 | Johnson | |
| 5,682,478 A | 10/1997 | Watson et al. | |
| 5,689,638 A | 11/1997 | Sadovsky | |
| 5,692,049 A | 11/1997 | Johnson | |
| 5,694,595 A | 12/1997 | Jacobs et al. | |
| 5,696,824 A | 12/1997 | Walsh | |
| 5,699,528 A * | 12/1997 | Hogan | 705/40 |
| 5,708,780 A | 1/1998 | Levergood et al. | |
| 5,708,828 A | 1/1998 | Coleman | |
| 5,715,314 A | 2/1998 | Payne et al. | |
| 5,729,689 A | 3/1998 | Allard et al. | |
| 5,740,252 A * | 4/1998 | Minor et al. | 713/153 |
| 5,757,920 A | 5/1998 | Misra et al. | |
| 5,765,152 A * | 6/1998 | Erickson | 707/9 |
| 5,768,382 A * | 6/1998 | Schneier et al. | 380/251 |
| 5,768,504 A | 6/1998 | Kells et al. | |
| 5,768,508 A | 6/1998 | Eikeland | |
| 5,774,551 A | 6/1998 | Wu et al. | |
| 5,774,869 A | 6/1998 | Toader | |
| 5,787,254 A | 7/1998 | Maddalozzo et al. | |
| 5,790,785 A | 8/1998 | Klug et al. | |
| 5,794,210 A | 8/1998 | Goldhaber et al. | |
| 5,805,815 A | 9/1998 | Hill | |
| 5,809,144 A | 9/1998 | Sirbu et al. | |
| 5,809,237 A | 9/1998 | Watts et al. | |
| 5,809,242 A | 9/1998 | Shaw et al. | |
| 5,812,776 A * | 9/1998 | Gifford | 709/217 |
| 5,812,784 A | 9/1998 | Watson et al. | |
| 5,813,009 A | 9/1998 | Johnson et al. | |
| 5,848,412 A | 12/1998 | Rowland et al. | |
| 5,855,007 A | 12/1998 | Jovicic et al. | |
| 5,866,889 A | 2/1999 | Weiss et al. | |
| 5,884,312 A | 3/1999 | Dustan et al. | |
| 5,890,140 A | 3/1999 | Clark et al. | |
| 5,892,917 A | 4/1999 | Myerson | |
| 5,910,987 A | 6/1999 | Ginter et al. | |
| 5,918,224 A | 6/1999 | Bredenberg | |
| 5,941,947 A | 8/1999 | Brown et al. | |
| 5,944,794 A | 8/1999 | Okamoto et al. | |
| 5,948,061 A | 9/1999 | Merriman et al. | |
| 5,983,351 A | 11/1999 | Glogau | |
| 6,011,537 A | 1/2000 | Slotznick | |
| 6,029,195 A | 2/2000 | Herz | |
| 6,058,378 A | 5/2000 | Clark et al. | |
| 6,058,393 A | 5/2000 | Meier et al. | |
| 6,073,105 A | 6/2000 | Sutcliffe et al. | |
| 6,094,677 A | 7/2000 | Capek et al. | |
| 6,131,810 A | 10/2000 | Weiss et al. | |
| 6,173,287 B1 | 1/2001 | Eberman et al. | |
| 6,247,047 B1 | 6/2001 | Wolff | |
| 6,308,202 B1 | 10/2001 | Cohn et al. | |
| 6,385,592 B1 | 5/2002 | Angles et al. | |
| 6,507,872 B1 | 1/2003 | Geshwind | |
| 6,823,327 B1 | 11/2004 | Klug et al. | |
| 6,892,354 B1 | 5/2005 | Servan-Schreiber et al. | |

FOREIGN PATENT DOCUMENTS

| | | | |
|---|---|---|---|
| WO | WO9608756 | * | 3/1996 |

OTHER PUBLICATIONS

About Netscape, Netscape, Firefly, and VeriSign Propose Open Prefiling Standard (OPS) to Enable Broad Personalization of Internet Services, (printed May 28, 1997), 3 pages.

Advertisement in 1995 by Internet Profiles Corporation on the World Wide Web, at Website URL: http://www.ipro.com.

Author Unknown, "News from Newshare Corp: Clickshare Universal-ID, profiling and micro-transaction system enters alpha; personalized test drives" begin, Business Wire, Oct. 23, 1995.

Author Unknown, "One-bill, universal-password access to Internet information available by subscription of "by click" early next year via Newshare Corp.'s "Clickshare" publishing system; advertisers can track systemwide visits by anonymous user", Business Wire, Sep. 15, 1995.

Author Unknown, "The Checkfree Wallet Enables Secure Internet Purchases", PR Newswire, Apr. 10, 1995.

Baron et al., "Implementing a Web Shopping Cart", Dr. Dobb's Journal, No. 251, pp. 64-85, 1996.

Buck, S. Peter, "Electronic commerce—would, could and should you use current Internet payment mechanisms?", Internet Research: Electronic Networking Applications and Policy, vol. 6, No. 2/3, pp. 5-18, 1996.

"C&WC Lays Out Interactive TV Plans," Computer Program International, CGN08200041, ComputerWire Inc., (Aug. 20, 1998).

Davison, Andrew, "Coding with HTML Forms", Dr. Dobb's Journal, No. 231, pp. 70-75 and 106-109, Jun. 1995.

Dutt, G. Dinesh, "CGI and the World Wide Web", Dr. Dobb's Journal, No. 244, pp. 42-50 and 92-96, Feb. 1996.

Fickenscher, Lisa, "Discover's Virtual Card Follows Users Around the Web", The American Banker, Feb. 3, 2000.

Hämmäinen et al., "Distributed Form Management", ACM Transactions on Information Systems, vol. 8, No. 1, pp. 50-76, Jan. 1990.

Hill, G. Christian, "Group of Firms Propose Standard for Privacy on Net," The Wall Street Journal, (May 27, 1997), 2 pages.

Kerven, David, "HTML 3 How-To", Waite Group Press, Corte Madera, CA, pp. 326-329, 1996.

McMahon, P.V., "Sesame V2 Public Key & Authorization to Kerberos", IEEE, pp. 114-130.

"NCR: NCR & Quadstone Help Banks Improve Service and Reduce Risk by Better Predicting Customer Behaviour," M2 Presswire, M2 Communications, Ltd., (Jul. 6, 1998).

Pitt, Brad, Internet Pathfinder, E-Mail News Web-Business News, Internet leaders to Offer Privacy Protection, (no date), 2 pages.

Sirbu et al., "NetBill: An Internet Commerce System Optimized for Network-Delivered Services", Digest of Papers—Compcon '95—Technologies for the Information Superhighway, vol. 2, No. 4, Aug. 1995.

Sirbu et al., "NetBill: An Internet Commerce System Optimized for Network-Delivered Services", IEEE Personal Communications, San Francisco, CA, vol. 2, No. 4, Mar. 5-9, 1995.

Slater, A.F., "Controlled by the Web", Computer Networks and ISDN Systems, No. 27, pp. 289-295, 1994.

Trostle, J.T., "A Flexible Distributed Authorization Protocol", IEEE, pp. 43-52.

Welz, Gary, "A ripening Internet market, secure systems, and digital currency are reshaping global commerce", Internet World, pp. 36-41, Jun. 1995.

World, "Netscape Pitches OPS for Push Delivery," (May 26, 1997), 1 page.

Yamada, Ken, "Tracking a Silent Threat", Computer Reseller News, ISSN: 0893-8377, p. 45, Jun. 19, 1995.

Complaint and Jury Demand, Register Systems LLC vs. Amazon. com, Target Corporation and Target.com, Case 1:05-cv-02676-MSK, 11 pages, filed Dec. 30, 2005.

Request for Ex Parte Reexamination of U.S. Appl. No. 5,823,327, issued Oct. 20, 1998.
Request for Ex Parte Reexamination of U.S. Appl. No. 5,790,785, issued Aug. 4, 1998.
Request for Ex Parte Reexamination of U.S. Appl. No. 6,823,327, issued Nov. 23, 2004.
Order Granting Request for Ex Parte Reexamination of U.S. Appl. No. 5,790,785, issued Aug. 4, 1998. Reexamination Serial No. 90/007,961.
Author Unknown, Business Wire, "CompuServe Selects I/PRO—Internet Profiles Corporation— to Provide User Registration and Measurement Capabilities for the World's First $1 Million Internet Scavenger Hunt," published Jun. 20, 2995, 2 pages.
Author Unknown, CompuServe, "CompuServe Internet Hunt," CompuServe Magazine, Aug. 1995, p. 56, 2 page.
Author Unknown, CompuServe, " The CompuServe $1,000,000 Internet Hunt 1995 Official Contest Rules," CompuServe Magazine, Oct. 1995, p. 48, 2 pages.
Author Unknown, web pages describing the I/CODE Universal Registration System, published by Internet Profiles Corporation, www.ipro.com, Aug. 29, 1995, 4 pages.
Author Unknown, Market Research Firms Target Web Traffic Data, PC Week, May 29, 1995, 2 pages.
Author Unknown, Internet Profiles Corporation Business Plan, Mar. 1995, 39 pages.
Hall, D., et al., *Build a Website: The Programmer's Guide to Creating, Building and Maintaining a Web Presence*, First Edition, Apr. 1995, submitted on CD-Rom.
Pathfinder Source Code, 1385 computer files representing the source code for a software application called Pathfinder, submitted on CD-Rom.
Reexamination Application No. 95/000,212 filed Jan. 5, 2007, submitted on CD-Rom.
Office Action in Ex Parte Reexamination Application No. 90/007,961, mailed Oct. 22, 2007, 13 pages.
Order Granting Request for Ex Parte Reexamination Application No. 90/007,962, mailed Apr. 25, 2006, 12 pages.
Office Action in Ex Parte Reexamination Application No. 90/007,962, mailed Nov. 05, 2007, 38 pages.
Order Granting Request for Inter Partes Reexamination, Application No. 95/000,212, mailed Mar. 21, 2007, 30 pages.
Office Action in Inter Partes Reexamination, Application No. 95/000,212, mailed May 21, 2007, 16 pages.
Response by Patent Owner to Office Action in Inter Partes Reexamination Application No. 95/000,212, dated Aug. 29, 2007, 31 pages.
Office Action in Ex Parte Reexamination Application No. 90/007,961, mailed Oct. 22, 2007, 13 pages.
Response by Patent Owner to Office Action in Ex Partes Reexamination Application No. 90/007,961 dated Dec. 21, 2007, 20 pages.
Order Granting Request for Ex Parte Reexamination Application No. 90/007,962, mailed Apr. 25, 2006, 12 pages.
Office Action in Ex Parte Reexamination Application No. 90/007,962, mailed Nov. 05, 2007, 38 pages.
Response by Patent Owner to Office Action in Ex Partes Reexamination Application No. 90/007,962, dated Jan. 7, 2008, 20 pages.
Order Granting Request for Inter Partes Reexamination, Application No. 95/000,212, mailed Mar. 21, 2007, 30 pages.
Office Action in Inter Partes Reexamination, Application No. 95/000,212, mailed May 21, 2007, 16 pages.
Response by Patent Owner to Office Action in Inter Partes Reexamination Application No. 95/000,212, dated Aug. 29, 2007, 31 pages.

* cited by examiner

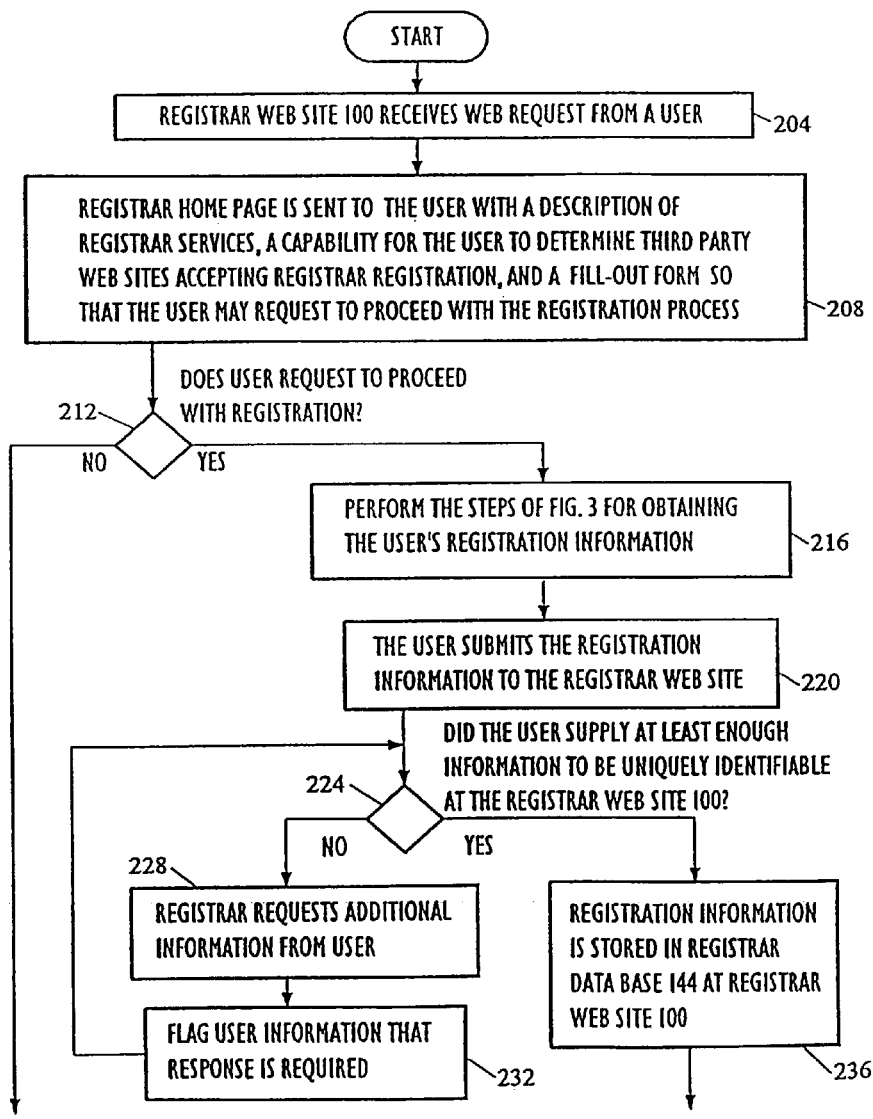
FIG. 2A  REGISTRAR REGISTRATION USING REGISTRAR WEB SITE TO STORE REGISTRATION INFORMATION FOR TRANSMITTAL TO THIRD PARTY WEB SITES FROM REGISTRAR WEB SITE (MAY BE INVOKED BY THE USER OR BY FIGS. 4)

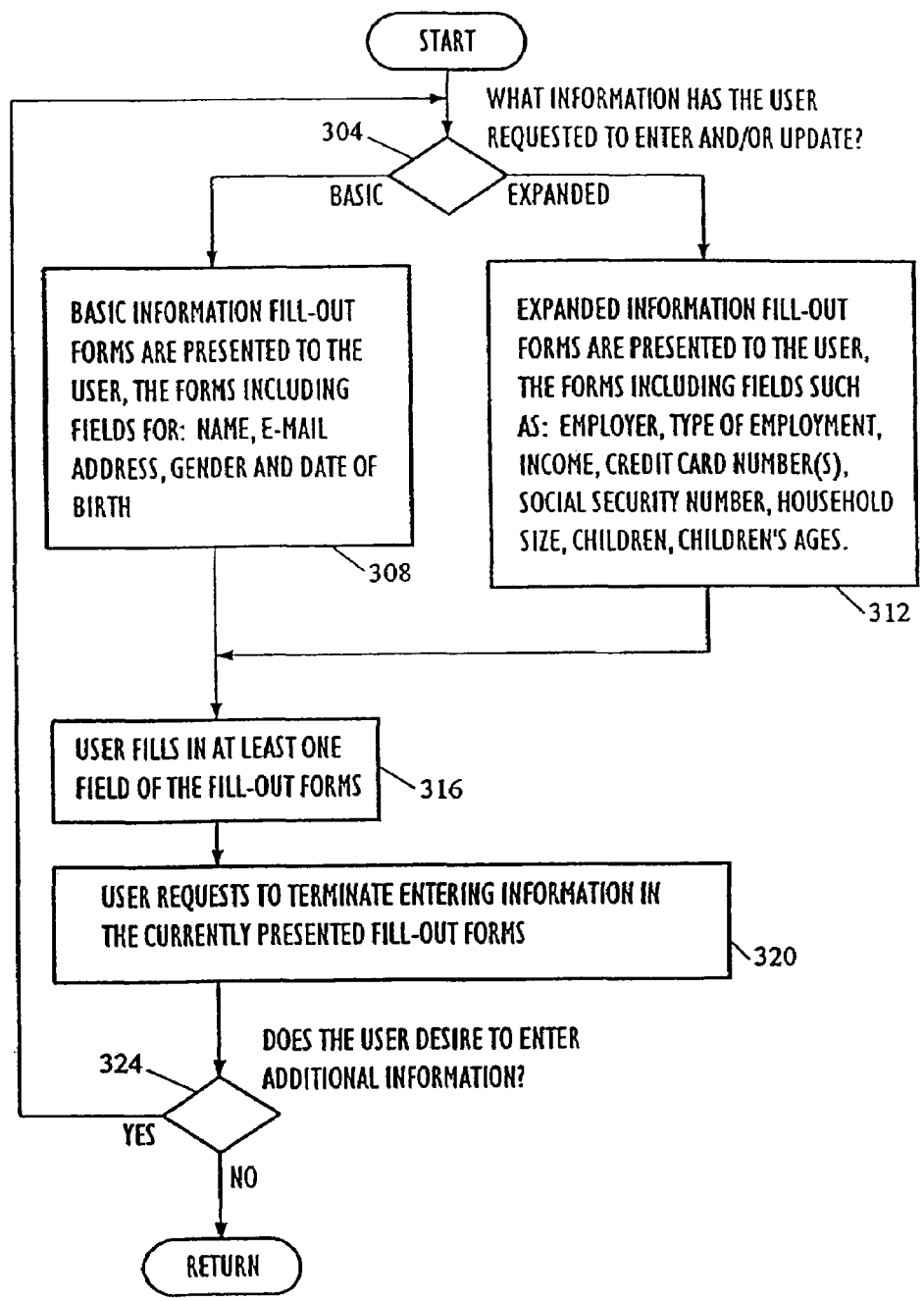
FIG. 3 USER ENTERS REGISTRAR INFORMATION (MAY BE INVOKED BY FIGS. 2 AND 12)

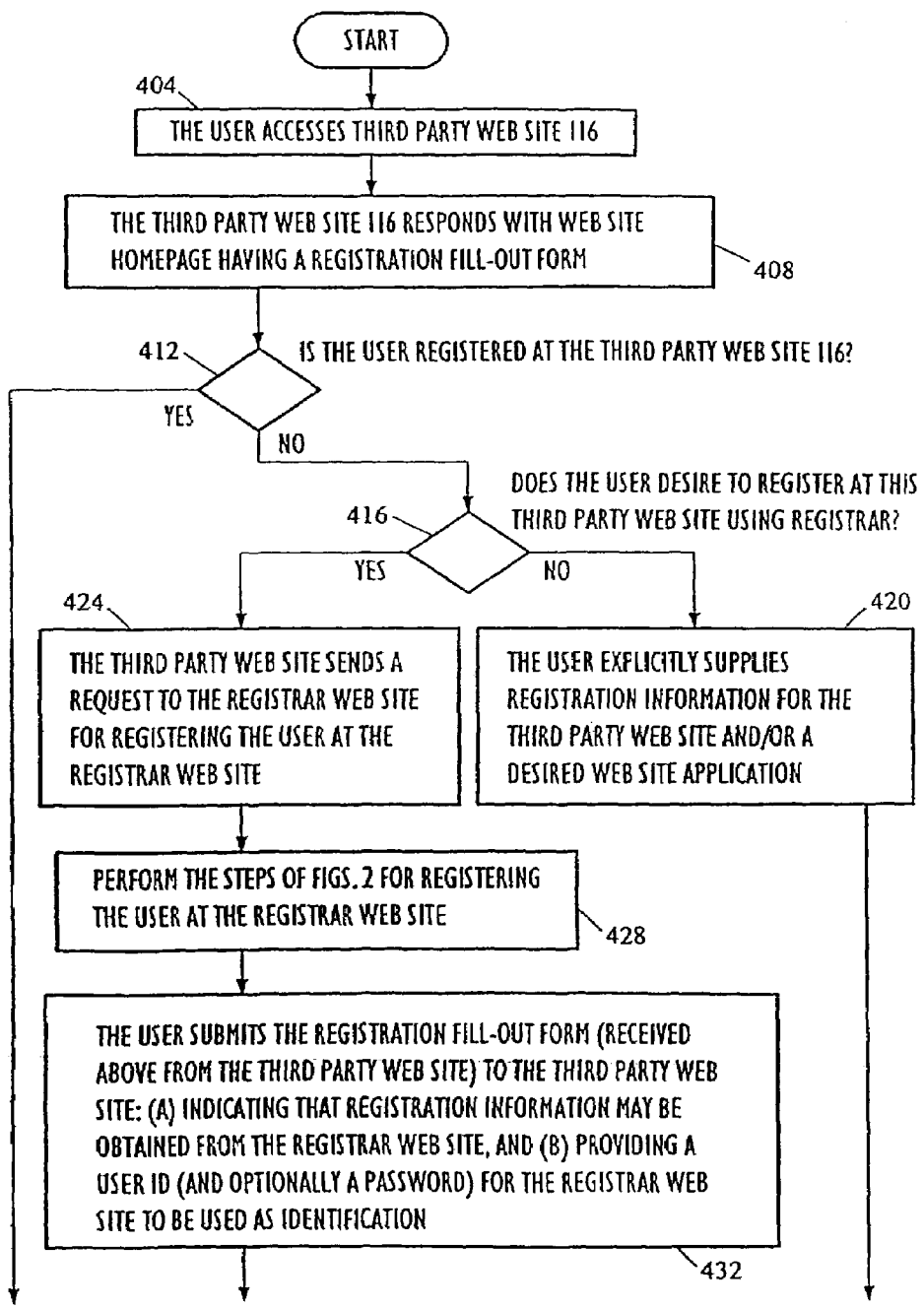
FIG. 4A  THE USER REGISTERS AT THE REGISTRAR WEB SITE WHEREIN A THIRD PARTY WEB SITE IS FIRST ACCESSED FIG. 5  REGISTRATION TRANSMISSION PROCESS BETWEEN REGISTRAR WEB SITE AND THIRD PARTY WEB SITE (MAY BE INVOKED BY FIGS. 4)
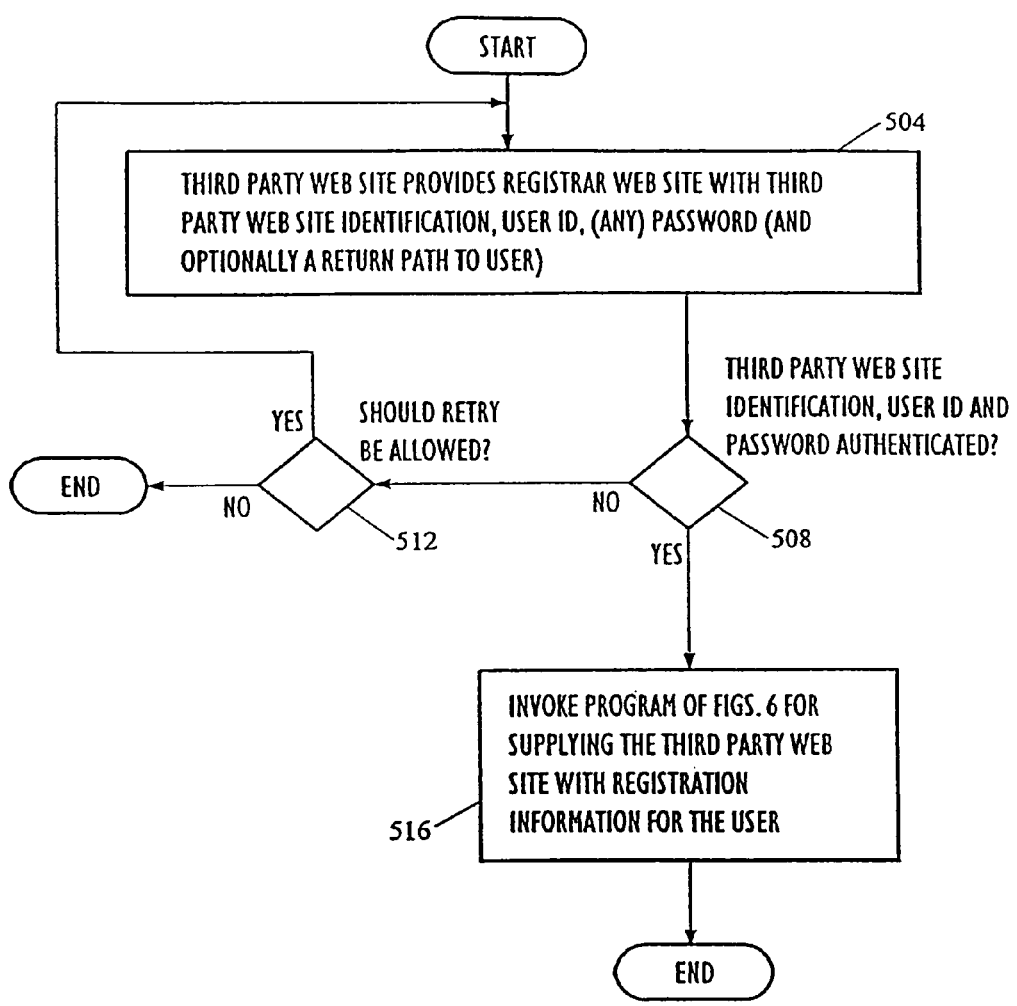

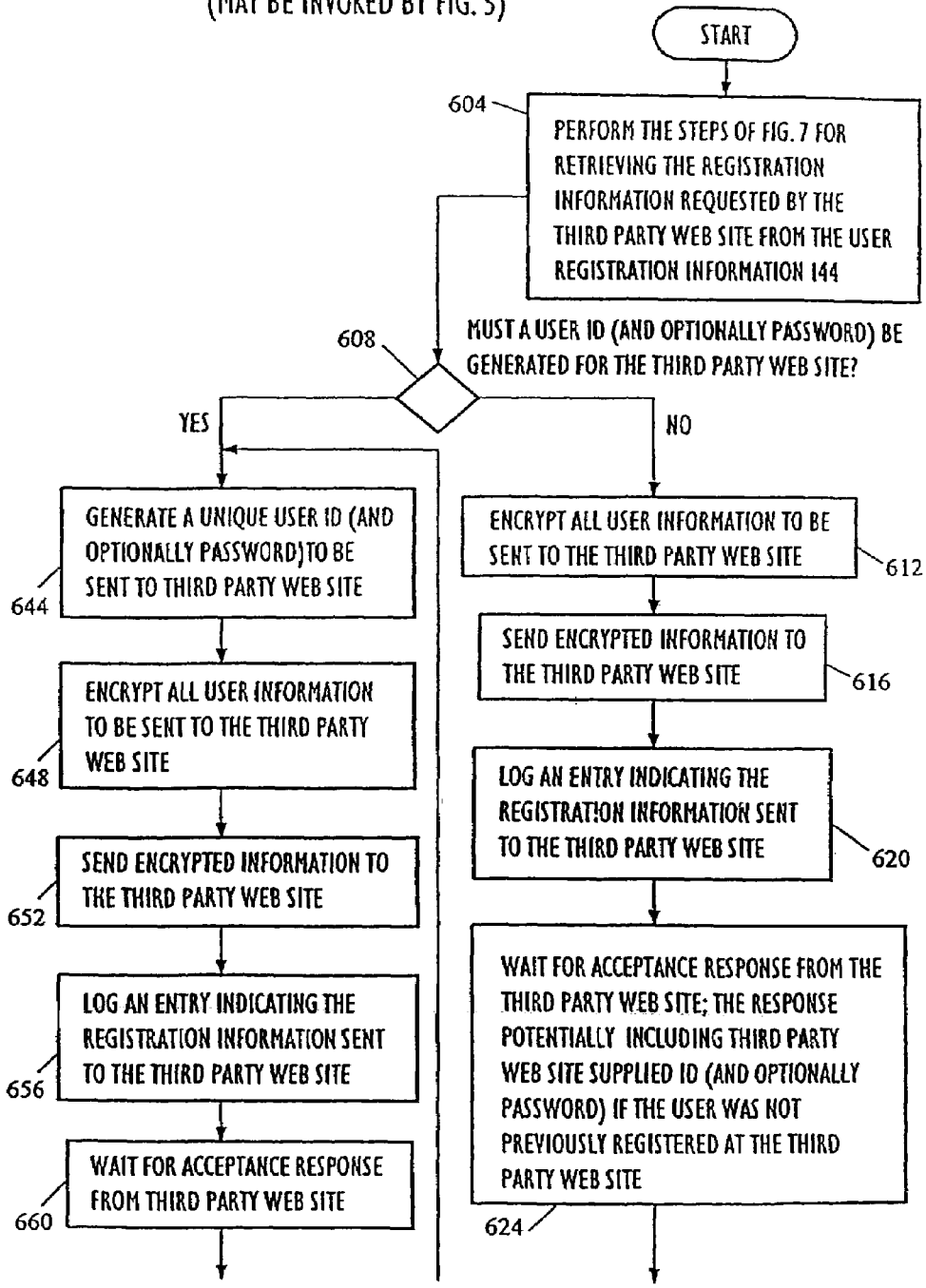

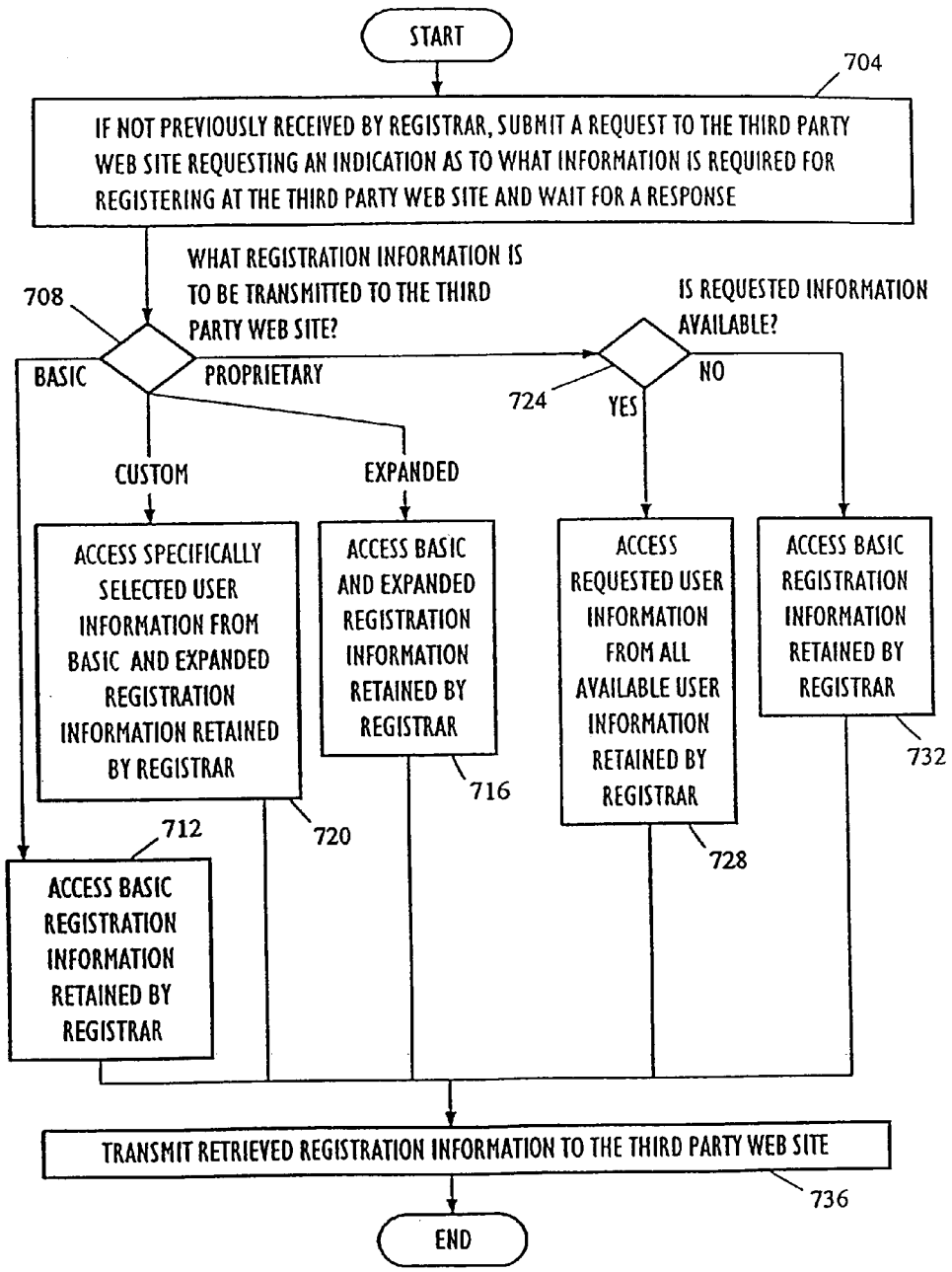
FIG. 7 PROGRAM FOR ACCESSING REGISTRATION INFORMATION FOR A THIRD PARTY WEB SITE (MAY BE INVOKED BY FIGS. 6A AND 10)

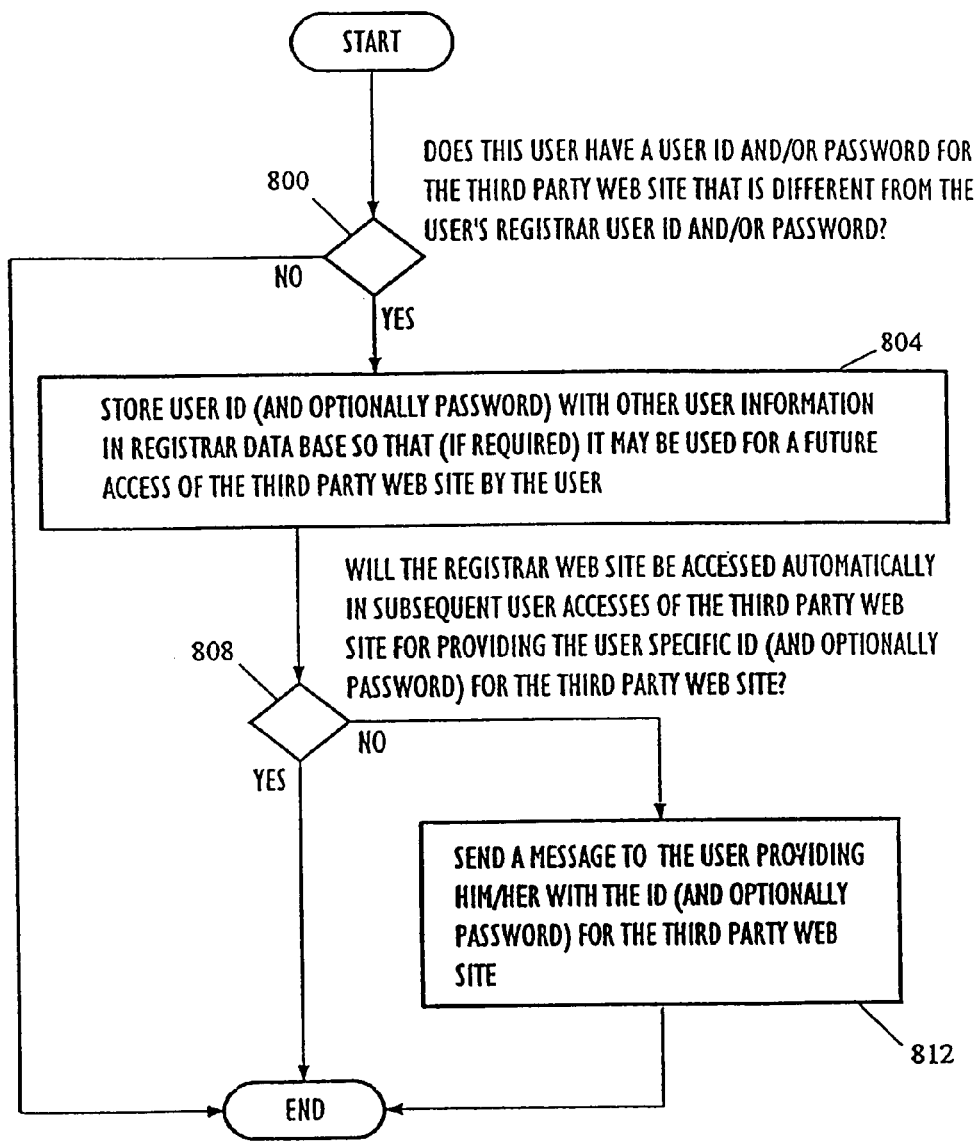

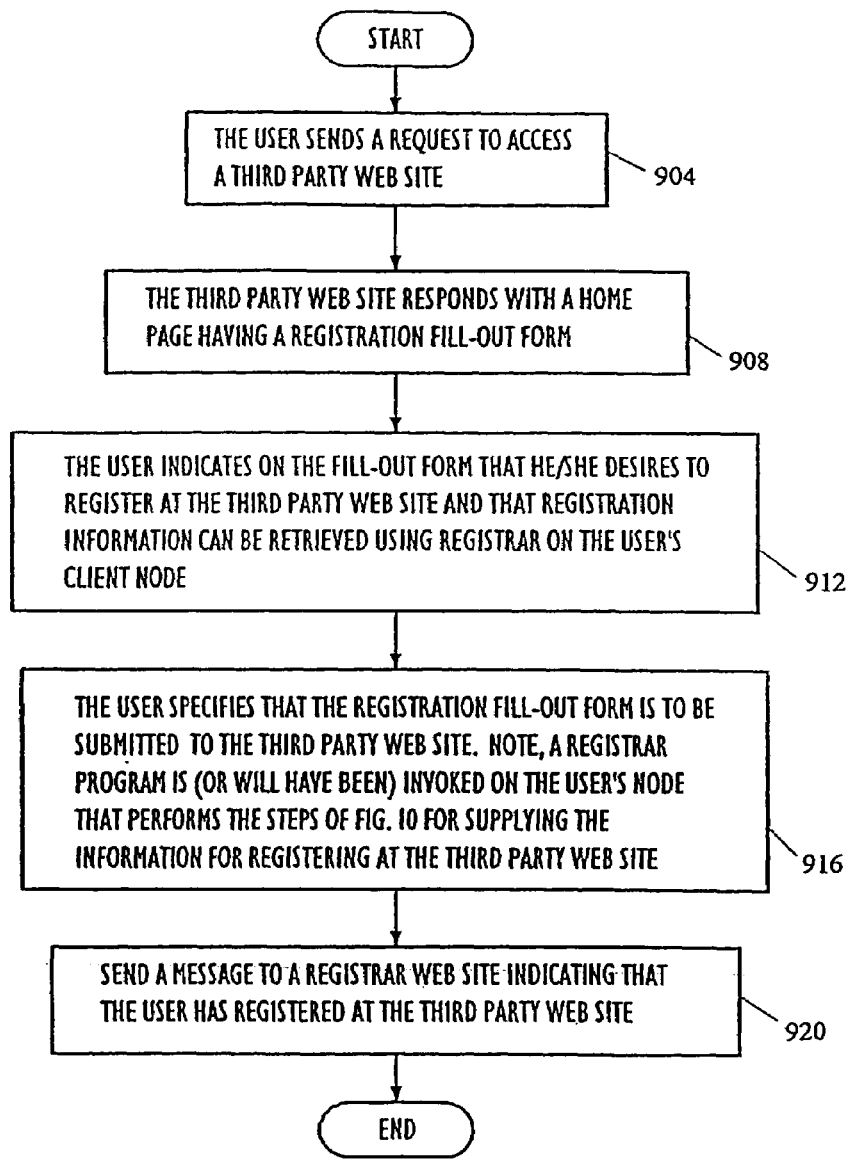
FIG. 9  REGISTRATION TRANSMISSION PROCESS BETWEEN REGISTRAR ON THE USER'S NETWORK NODE AND A THIRD PARTY WEB SITE (INVOKED BY THE USER)

FIG. 10 PROGRAM FOR SUPPLYING A THIRD PARTY WEB SITE WITH REGISTRATION INFORMATION RETAINED BY REGISTRAR ON THE USER'S NODE (MAY BE INVOKED BY FIG. 9)
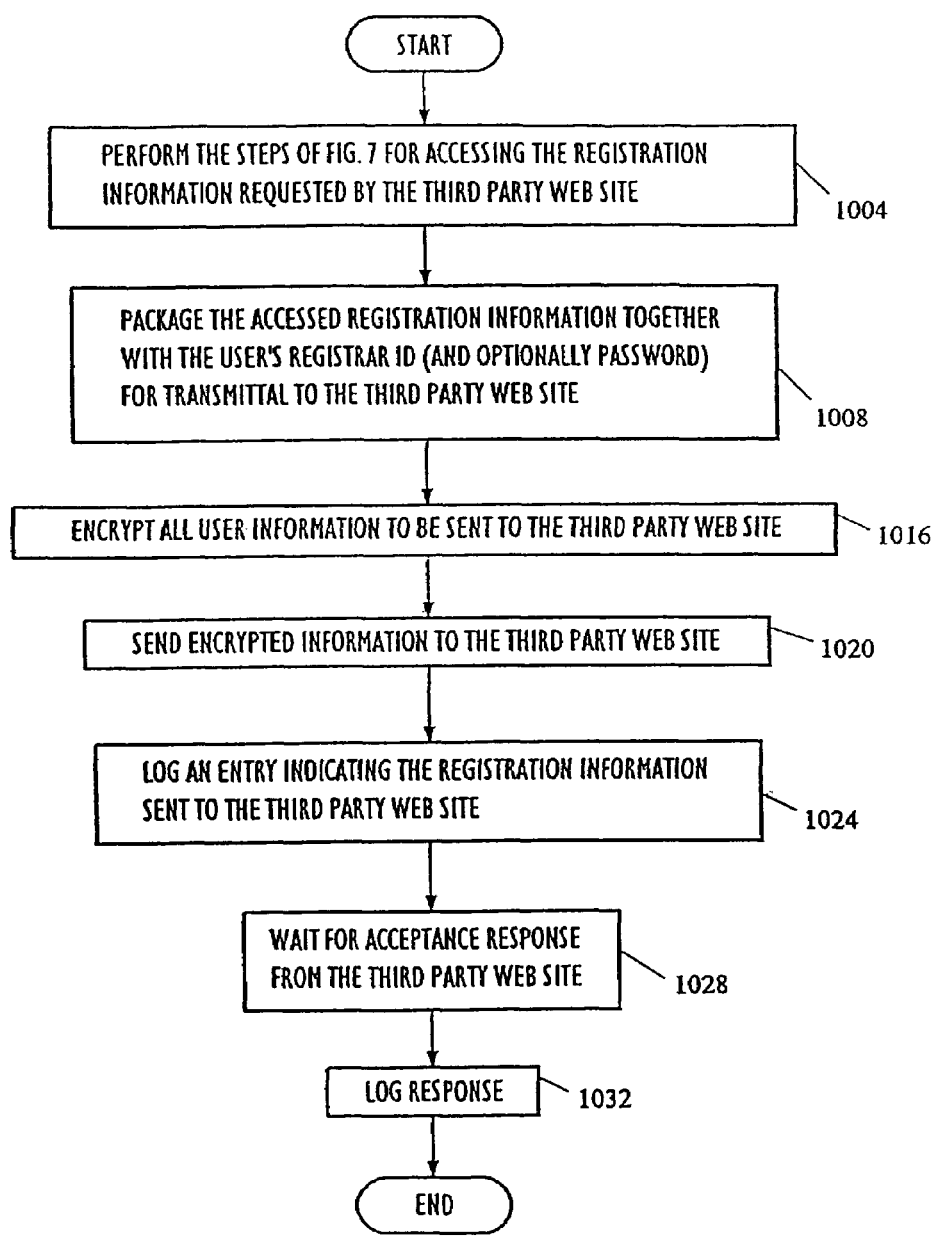

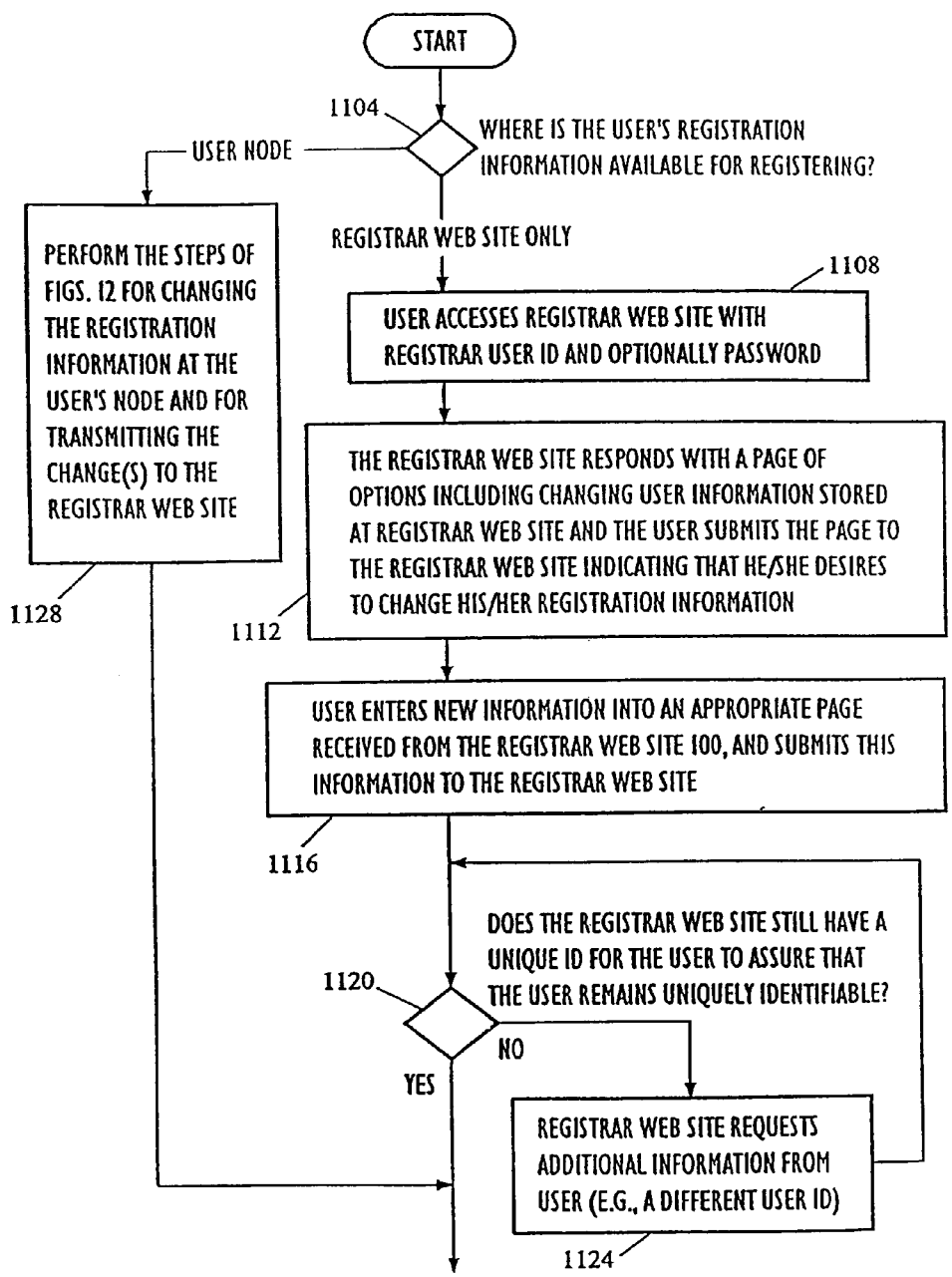
FIG. 11A  CHANGE USER INFORMATION IN REGISTRAR (INVOKED BY THE USER)

FIG. 12A USER ENTERS REGISTRATION INFORMATION INTO THE USER'S CLIENT NODE FOR TRANSMITTAL FROM THE USER'S NODE TO THE REGISTRAR WEB SITE (MAY BE INVOKED DIRECTLY BY THE USER OR BY FIGS. 11)
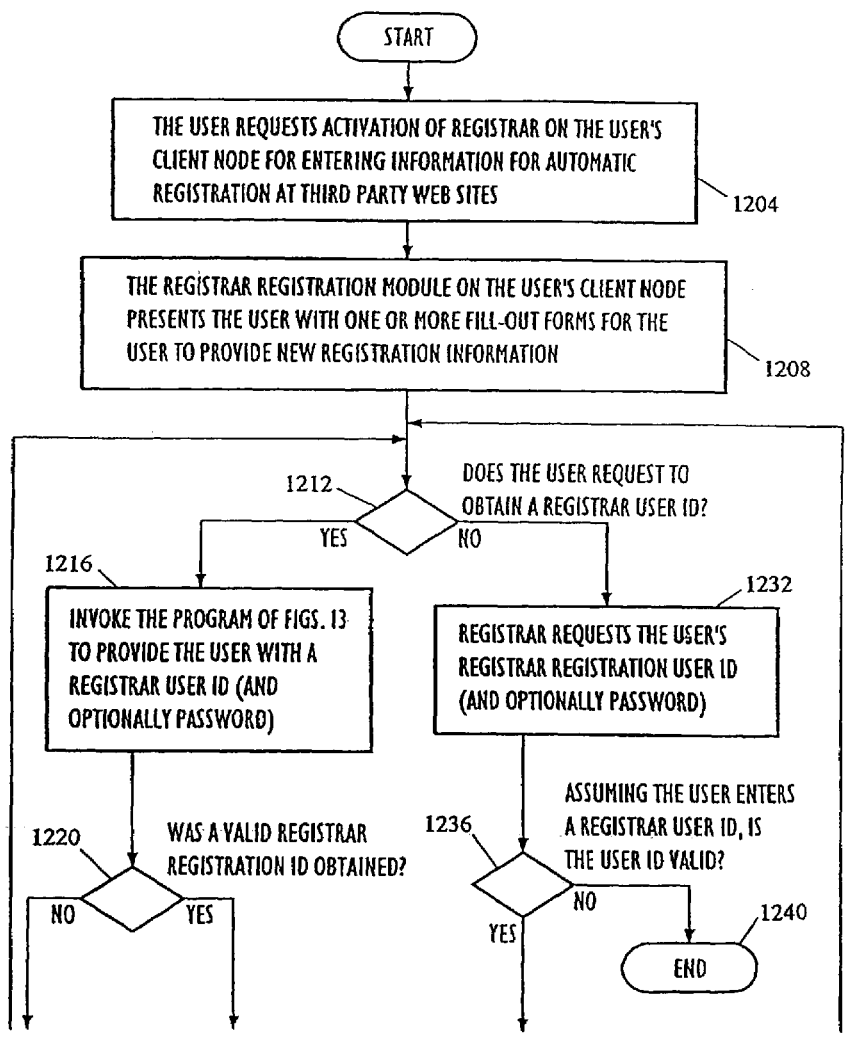

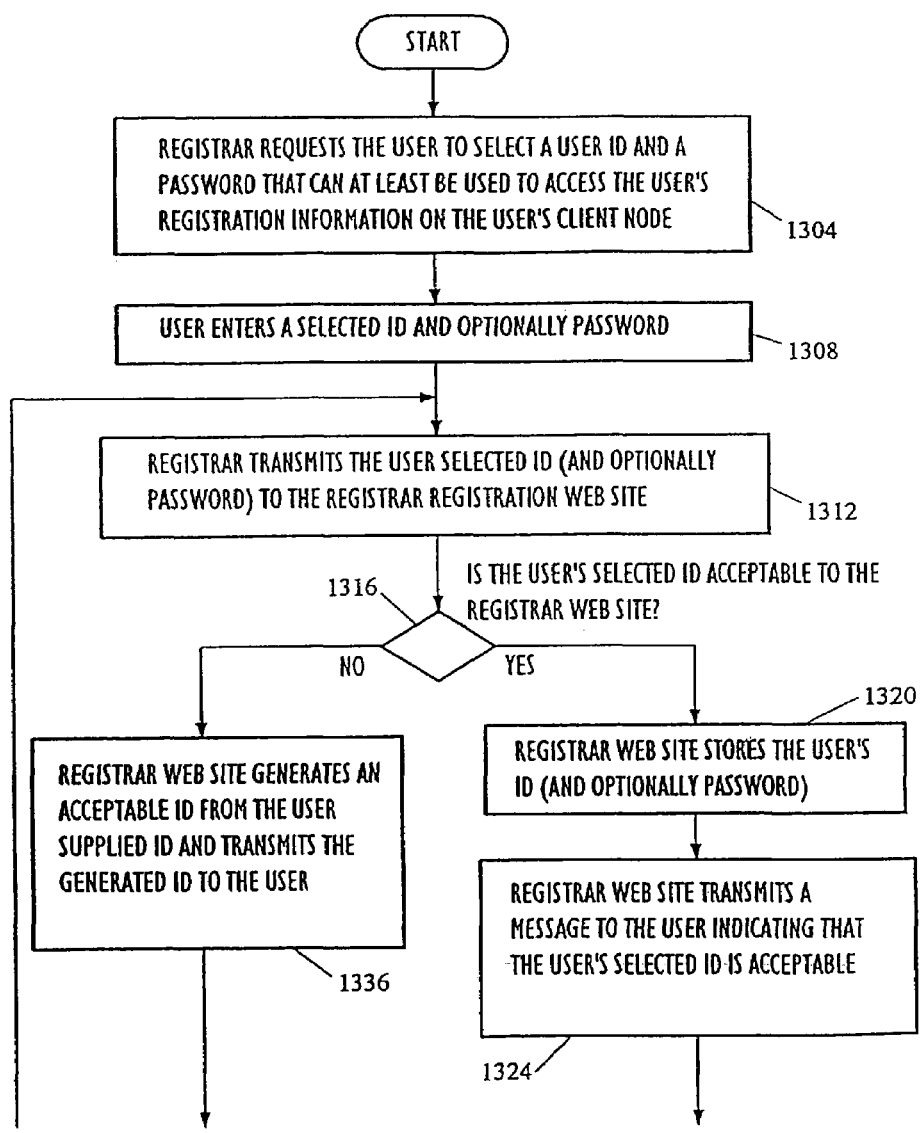
FIG. 13A  REGISTRAR USER ID PROVIDED FOR USER WHEREIN THE USER'S WEB SITE REGISTRATION IS MAINTAINED ON THE USER'S CLIENT NODE

WORLD WIDE WEB REGISTRATION INFORMATION PROCESSING SYSTEM

CROSS REFERENCES TO RELATED APPLICATIONS

The present application is a divisional patent application of U.S. patent application Ser. No. 10/411,829, filed on Apr. 10, 2003, and entitled, "World Wide Web Registration Information Processing System"; which is a continuation patent application of U.S. patent application Ser. No. 09/884,779, filed Jun. 19, 2001, now U.S. Pat. No. 6,823,327 and entitled, "World Wide Web Registration Information Processing System"; which is a continuation patent application of U.S. patent application Ser. No. 09/128,915, filed Aug. 4, 1998, and entitled, "World Wide Web Registration Information Processing System" now abandoned; which is a continuation patent application of U.S. patent application Ser. No. 08/595,837, filed Feb. 2, 1996, and entitled "World Wide Web Registration Information Processing System" now U.S. Pat. No. 5,790,785; which claims the benefit of U.S. Provisional Application No. 60/008,736, filed Dec. 11, 1995, and entitled "World Wide Web Registration Information Processing System"; the disclosures of which are hereby incorporated herein in their entireties.

FIELD OF INVENTION

The present invention relates to a system for assisting World Wide Web users in registering at World Wide Web web sites. In particular, the present invention provides storage and access to web site registration information provided by a user of the present invention so that, upon requesting to register at a web site that cooperates with the present invention, the user can request his/her web site registration information stored by the present invention to be transmitted to the cooperating web site.

BACKGROUND OF INVENTION

The World Wide Web (WWW) is a global communications network having a client-server model as a paradigm for communications. That is, users on client nodes utilizing so called "web browsers" navigate the WWW to access desired server nodes (known as web sites) for at least obtaining information from the server nodes such as hypertext, audio, video, virtual reality, data, etc. For many web sites, it is important to those responsible for the design and maintenance of the web sites that they be capable of accurately measuring both the number and types o users accessing their web sites. In particular, such measurements may be important in determining fees that can be charged by web site developers for building and maintaining a web site. Further, such information may be useful in determining the degree of interest in services and products by web site users. Thus, in order to obtain these web site measurements, such web sites have begun requesting that each user provide information about himself/herself prior to the web site allowing access to web site services. That is, such web sites require a user to "register" at the web site, wherein the user is required to establish a user identification (user ID) and optionally a password with the web site as well as typically provide personal information such as, for example, the city of residence or family size. However, registering at multiple web sites is burdensome for users in that it is: (a) time consuming, and (b) the user is likely to have different user Ids at different web sites, thus requiring a user to maintain a list of user Ids (and optionally passwords) for the web sites to which he/she is registered.

Therefore, it would be advantageous to alleviate many of the above difficulties by automating the registration process at web sites so that users may register at a single web site and use the information provided at this web sited to more easily register at other web sites.

SUMMARY OF INVENTION

The present invention is a registration information processing system for the World Wide Web that substantially automates the user registration process at web sites. The registration system of the present invention includes a World Wide Web registration web site wherein a user accessing the World Wide Web can utilize this web site as a repository for registration information so that the user can request this registration information to be transmitted substantially automatically to another web site to which the user desires to register. Furthermore, the present invention provides the user with a common user ID, and optionally common password, that can be used to access a plurality of web sites so that there are fewer web site user IDs and passwords for the user to remember. Additionally, the present invention may establish the common user ID (and optionally password) through user input such that the user may request a candidate user ID (and optionally password) and, if acceptable, the candidate user ID becomes the common user ID. However, if the candidate user ID is unacceptable (e.g., because it is a duplicate of another user's common user ID), then the present invention provides the user with one or more alternatives for the common user ID (and optionally password) that the user may accept or reject. Further, note that whenever possible the present invention provides the user with alternative common user Ids wherein the alternatives are derived from the candidate user ID provided by the user.

The registration information processing system of the present invention has a first embodiment using a first system architecture wherein a user need not have any modules specific to the present invention loaded on his/her World Wide Web client node. In this embodiment, once the user has provided registration information to the registration web site of the present invention, when the user subsequently requests to register at a new web site cooperating with the registration process of the present invention, then the user provides this new web site with a user ID and optionally password (e.g., the above-mentioned common user ID) for the registration web site of the present invention together with an indication that any further information may be obtained from the registration web site. The new web site subsequently is able to automatically retrieve the user's registration information from the registration web site and register the user at the new web site. In a second embodiment of the present invention having a second architecture, World Wide Web client nodes have registration modules for the present invention loaded on them so that these nodes may interact with the registration web site for providing user registration information to cooperating web sites to which the user requests to register. In this second embodiment of the present invention, the user's registration information is stored both locally on the user's client node and at the registration web site, the web site being used as a backup. Thus, when the user desires to register at a new web site, the user's registration information is provided to the web site from the registration module residing on the user's client node.

In either embodiment, the present invention may also provide a "mass" registration capability, wherein a user may request that the present invention automatically register the user at a plurality of web sites. For example, the user may be provided with a capability to search for web sites cooperating with the present invention by, for example, category and request an automatic registration at multiple web sites substantially simultaneously.

Other features and benefits of the present invention will become apparent from the detailed description with the accompanying figures contained hereinafter.

BRIEF DESCRIPTION OF THE DRAWINGS

FIGS. 2A and 2B provide a flowchart for describing the steps performed when a user of the World Wide Web explicitly contacts the registrar web site 100 of the present invention for supplying registration information to be used in registering at third party web sites 116;

FIG. 3 is a flowchart presenting the steps a user of the World Wide Web performs when entering web site registration information into fill-out forms that are to be submitted to the registrar web site 100 of the present invention;

FIGS. 4A and 4B present a flowchart for the steps performed when a user of the World Wide Web accesses a third party web site 116, cooperating with the present invention, and in the process of registering at the third party web site the user is automatically put in contact with the registrar web site 100 of the present invention so that registration information may be provided to the present invention for registering the user at the present third party web site as well as other third party web sites that the user may subsequently request;

FIG. 5 is a flowchart of the steps performed by the present invention when transferring user registration information from the registrar web site 100 to a third party web site 116 to which the user has requested to register;

FIGS. 6A and 6B provide a flowchart of the steps performed when supplying a third party web site 116 with registration information from the registrar web site 100, assuming that the third party web site has requested such information and that the request has been authenticated at the registrar web site 100;

FIG. 7 presents a flowchart of the steps performed by the present invention when supplying a third party web site 116 with user registration information from the user registration information database 144;

FIG. 8 presents a flowchart of the steps performed when storing in the user registration information database 144 a user's ID (and optionally password) relating to a third party web site 116 to which the user is registered via using the present invention;

FIG. 9 is a flowchart of the steps performed when registering at a third party web site 116 using the module 156 of the present invention installed on the user's client node 108;

FIG. 10 is a flowchart of the steps performed when the registration module 156 on the user's client node is utilized in supplying a third party web site 116 with registration information;

FIGS. 11A and 11B present a flowchart of the steps performed when a World Wide Web user of the present invention changes his/her registration information stored in the present invention;

FIGS. 12A and 12B present a flowchart of the steps performed when the architecture of the present invention includes the registration module 156 provided at the user's client node 108 and the user requests to enter registration information into the present invention using this module; and FIGS. 13A and 13B provide a flowchart of the steps performed when a World Wide Web user requests a user ID for the registration information processing system of the present invention and the present invention includes module 156 on the user's client node 108.

DETAILED DESCRIPTION

Figure 1:
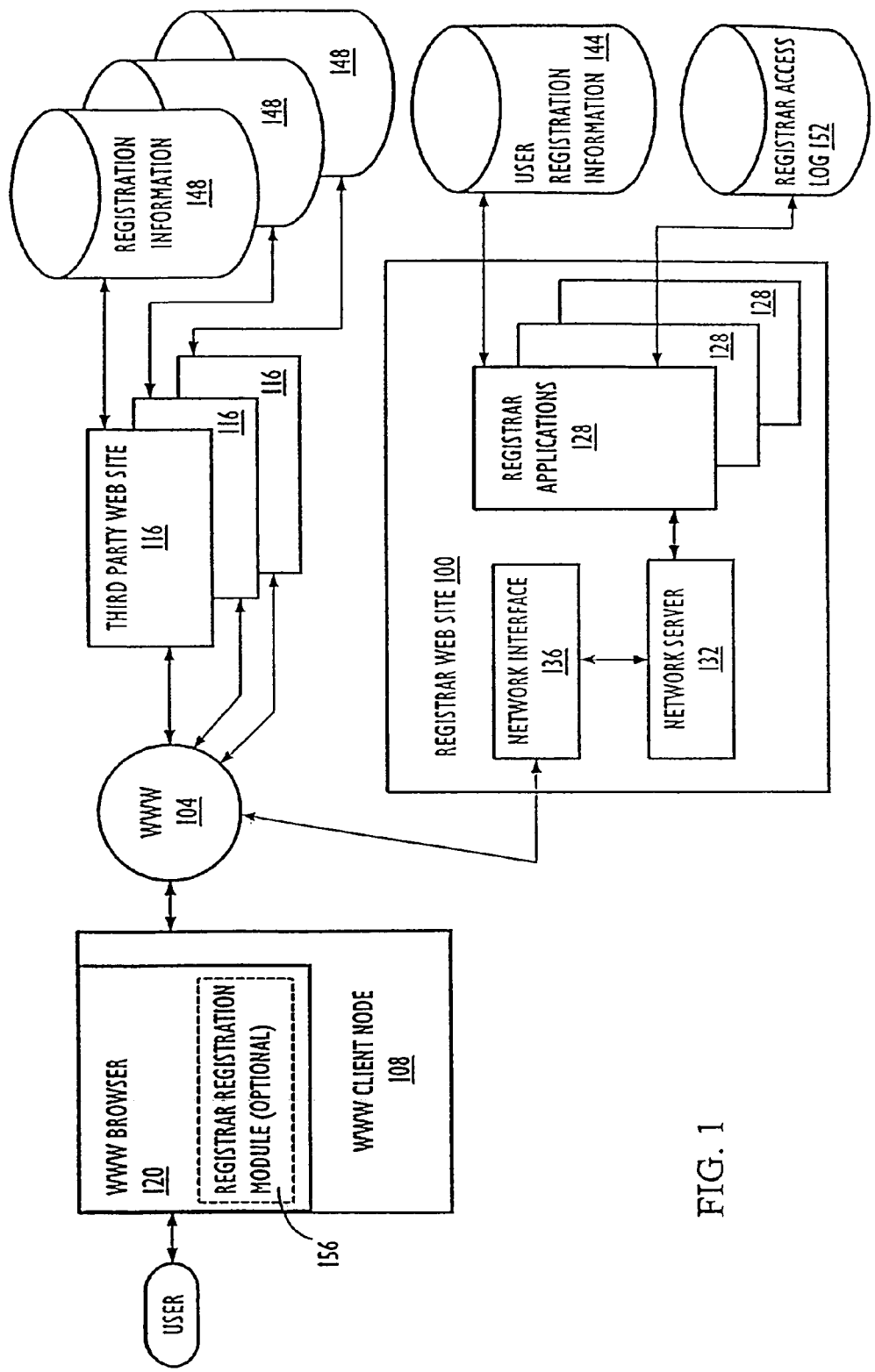
FIG. 1 is a block diagram of the web site registration information processing system of the present invention, wherein this system is shown in the context of its connections to various nodes of the World Wide Web.

FIG. 1 is a block diagram of a web site registration information processing system of the present invention, (hereinafter also denoted by the name "registrar") wherein this system is shown in the context of its connections to various nodes of the World Wide Web (WWW). In a first embodiment, a web site, denoted the registrar web site 100, provided by the present invention, is connected to the World Wide Web 104 for communicating with both World Wide Web client nodes such as WWW client node 108, and with other web sites such as third party web site 116, wherein the registrar web site 100 facilitates the registration of a user at a WWW client node 108 when this user desires to register at the third party web site 116. In this first embodiment, the user accesses the World Wide Web 104 through a WWW browser 120 on a WWW client node 108 wherein, to use the registration facilities of the registrar web site 100 for registering the user at a one or more third party web sites 116, the user must in some manner request explicit access to the registrar web site 100 for registering his/her registration information to the registrar web site 100. Additionally, in this first embodiment of the present invention, the WWW client node 108 need not have executable program modules designed specifically for interfacing with the registrar web site 100. That is, substantially any conventional World Wide Web browser may be used as the WWW browser 120.

Thus, the first embodiment of the present invention may be described as follows. In order for a user to register at one or more third party web sites 116, the user at a WWW client node 108 accesses the World Wide Web 104 and in a first scenario explicitly navigates through the World Wide Web 104 to the registrar web site 100 wherein a registrar web site 100 home page is communicated back to the user's WWW browser 120. As one skilled in the art will appreciate, program modules 128 (hereinafter denoted "registrar applications") output, to a World Wide Web network server 132, information in, for example, a hypertext markup language (HTML) related to capabilities of the registrar web site 100 in assisting the user in registering at third party web sites 116. Such outputs from registrar applications 128, are subsequently transmitted, via the network server 132 and the network interface 136, to the user's WWW browser 120 in the hypertext transfer protocol (HTTP), as one skilled in the art will appreciate. Thus, upon presentation of the registrar web site 100 home page on the user's WWW client node 108, the user subsequently may request to provide registration information to the registrar web site 100 so that he/she can have this information at the registrar web site 100 automatically transferred to a third party web site 116 when the user is requested to register at such a third party web site. Subsequently, after the user's request to supply registration information is transmitted to the registrar web site 100 (via World Wide Web 104, network interface 136 and network server 132), the registrar applications 128 receive the request and output to the user's WWW browser 120 one or more "web pages" having fill-out forms to be presented to the user via the WWW browser 120. Thus, upon submittal of the filled out forms by the user to the registrar web site 100 (more precisely, the registrar applications 128), the user's registration information is stored in the user registration information database 144.

Following the above registration procedure at the registrar web site 100, the user may then substantially automatically register at various third party web sites 116 that are affiliated with the registrar web site 100 in that an agreement has been reached between each such third party web site 116 and the registrar web site 120 for transmitting a user's registration information to the third party web site 116 when, for example, the user requests such transmittal. Thus, assuming the user accesses the third party web site 116 and, for example, the home page for the third party web site 116 includes a form field allowing the user to specify that the user's registration information is stored and accessible at the registrar web site 100, then the user can submit a response, via the World Wide Web 104, to the third party web site 116 indicating that the user's registration information should be obtained from the registrar web site 100. Thus, the third party web site 116 requests and receives the user's registration information from the registrar web site 100 and stores the user's registration information in registration information database 148 directly accessible by the third party web site 116. Additionally note that when the registrar web site 100 receives a request from the third party web site 116 for user registration information, a registrar application 128 records the request for the user's registration information in a registrar access log data base 152. Thus, the registrar web site 100 maintains a log of the third party web sites requesting registration information. Further, such third party web sites 116 may periodically provide the registrar web site 100 with information related to the frequency that users registered at the registrar web site 100 have accessed the third party web sites 116. Therefore, by also storing this information, for example, in the registrar access log 152, the registrar web site 100 is able to determine the frequency and type of access of third party web sites 116 by users.

In a second method of using the first embodiment of the present invention, instead of the user explicitly navigating the World Wide Web 104 to the registrar web site 100 for providing registration information, the user may instead access a third party web site 116 wherein the home page or registration page for the third party web site includes input fields allowing the user to request that the registrar web site 100 automatically be accessed so that the user can enter web site registration information at the registrar web site 100 and subsequently use the registration information provided to the registrar web site 100 for automatically registering at the third party web site 116 (as well as other third party web sites that may be subsequently requested). That is, the newly entered registration information is transferred to the third party web site 116 by entering into a registrar specific portion of the registration form for the third party web site 116 a registrar user identification and optionally a password for requesting that the third party web site access the registrar web site 100 to obtain the user's registration information. Thus, the user's registration information automatically is communicated to the third party web site 116 without the user explicitly having to navigate the World Wide Web 104 and access the registrar web site 100 to register his/her web site registration information.

Note that alternative embodiments are within the scope of the present invention, wherein program modules for the present invention are distributed so that there is an executable module provided on the user's WWW client node 108 for communication with the registrar web site 100 as well as with third party web sites 116 that accept registration information from the present invention. In one embodiment of such a distributed architecture for the present invention, a registrar registration module 156 is integrated into the user's WWW browser 120 for gathering the user's web site registration information and communicating with the registrar web site 100 as well as cooperating third party web sites 116 at which the user desires to register. Such a registration module 156 may provide the user with easier access to his/her registration information since the information resides locally on the user's WWW client node 108 in a persistent nonvolatile storage. Further, the registrar registration module 156 may be activated for entering or updating user registration information without the user necessarily being connected to the World Wide Web 104. Moreover, by integrating the registrar registration module 156 into the user's WWW browser 120, the user is presented with an integrated set of functions for registering and accessing third party web sites 116.

Thus, in such distributed architectures, after the user has entered registration information into the registrar registration module 156, this module will substantially automatically contact the registrar web site 100 (via the World Wide Web 104) and thereby communicate the user's registration information to the registrar web site 100 so that, for example, the user's registration information may be reliably stored in case there are failures at the user's WWW client node 108. Thus, to access a third party web site 116 that cooperates with the registrar for registering the user, once the user has made contact through the World Wide Web 104 with such a third party web site 116, the user transfers his/her registration information from the registration module 156 to the third party web site. Further note that in the registration process of the present embodiment, whenever the user registers at a third party web site 116, the registrar web site 100 is provided, by (for example) the module 156, with information related to the registration so that the user also has a off-site backup copy of all registrations at third party web sites residing at the registrar web site 100.

Note that other distributed architectures for the present invention are also contemplated wherein the registrar registration module 156 on the user's WWW client node 108 is not integrated with the user's WWW browser 120. In such an embodiment, the user may be faced with a different user interaction technique for the module 156 than that of the WWW browser 120. However, the user is provided with added flexibility in choosing a WWW browser 120 and/or using his/her existing browser 120 which may not contain as part of the browser the registrar registration module 156.

Figure 2B:
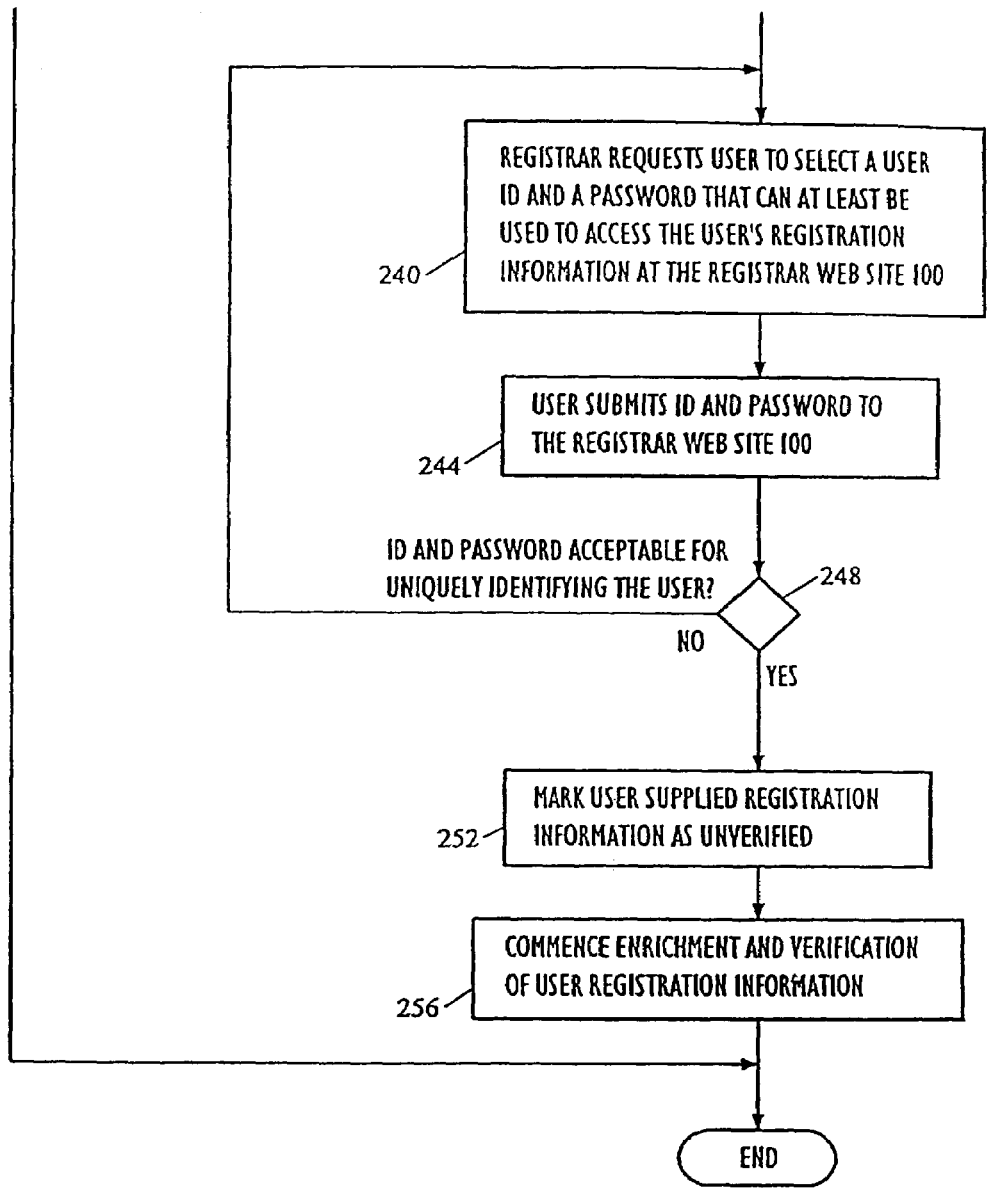

In FIGS. 2A and 2B, a flowchart is presented describing the steps performed when the user explicitly navigates the World Wide Web 104 to contact the registrar web site 100 for supplying registration information. Accordingly, assuming the user contacts the registrar web site 100, in step 204 the web site 100 receives the user's request for information. Subsequently, in step 208 the registrar web site 100 responds with a home page describing the registrar services, a selection or browsing capability for reviewing third party web sites 116 accepting registrar registrations, and a fill-out form so that the user may request to proceed, if desired, with entering registration information at the registrar web site 100. In step 212 the user determines whether to proceed with the registration process or not. Assuming the user elects to proceed, the request to proceed is transferred back to the registrar web site 100 wherein a registrar application 128 examines the response and outputs a fill-out form that is transmitted back to the user's WWW browser 120 so that the user may enter his/her registration information and submit it to the registrar web site 100. Thus, in step 216 the steps of the flowchart of FIG. 3 are performed by the user when entering information into the registration fill-out form provided by the registrar web site 100. Subsequently, in step 220 the user initiates the transfer of his/her registration information to the registrar web site 100. Note that the submittal of the registration information may be performed by a conventional electronic transfer through the World Wide Web 104 using any one of various internet protocols or, alternatively, other techniques for transferring the information to the registrar web site 100 are also contemplated. For example, the user may fax a printed copy of a completed registration form to the registrar web site 100 at which point the information may be manually input into the user registration information database 144. In step 224, upon receiving the user's registration information, one or more registrar applications 128 review the user's registration information for determining whether there is enough information supplied to at least uniquely identify the user. If not, then in steps 228 and 232 a registrar application(s) 128 requests additional information from the user and flags the user's information currently stored in the user registration information database 144 indicating that a user response is required to further process the user's information. As an aside, note that other feedback loops to the user are contemplated that are related to the loop of steps 224 through 232. For example, it may be the case that the user has supplied sufficient information to be uniquely identifiable at the registrar web site 100, but the user has supplied insufficient information for the registrar web site 100 to supply adequate information to most third party web sites 116 that utilize registrar registration capabilities. Thus, a similar feedback loop to loop 224 through 232 may be provided for requesting that the user supply additional information so that a substantial number of third party web sites 116 cooperative with registrar will allow the user to register at them using only the information supplied by the registrar web site 100.

Referring again to step 224, if a determination is made that sufficient registration information has been received at the registrar web site 100, the user's registration information is stored in the user registration information database 144 (step 236) and subsequently a registrar application 128 outputs a request to the user to select a user ID and password that can be at least used to access the user's registration information at the registrar web site 100 (step 240). Assuming, as in step 244, that the user submits a user ID and a password to the registrar web site 100, then in step 248 a determination is made by the present invention (more particularly, a registrar application 128) as to whether the user supplied ID and password is acceptable for uniquely identifying the user. If not, then steps 240 through 248 are repeated until an appropriate user ID and password are entered by the user. Thus, assuming that an acceptable user ID and password are provided, in step 252 the registration information supplied by the user is marked as unverified since there has been no independent confirmation that the user supplied information is accurate. Subsequently, in step 256 a registrar application 128 commences to enrich the user's supplied registration information with publicly available information related to the user and, to the degree possible (i.e., conforming with internet etiquette, privacy concerns of users, and public policy), to verify the user's registration information. Note that by comparing the user supplied information with information about the user from other sources, a determination can be made as to the accuracy of the user supplied information. Thus, whenever an item of the user supplied information is independently verified, then that item is unmarked. Alternatively, if discrepancies arise between the user-supplied information and other publicly available information about the user, then the user may be alerted to these discrepancies and requested to confirm his/her initial responses.

Referring now briefly to FIG. 3, this flowchart presents the steps a user performs when entering web site registration information into the fill-out forms to be submitted to registrar. Accordingly, in step 304 the user determines whether to supply basic information (i.e., requested by a substantial number of third party web sites 116) as described in step 308 or to supply expanded information (i.e., more extensive information about the user so that, for example, registrar has sufficient user information to register the user at substantially all cooperating third party web sites 116). Note that at least in one embodiment, the basic information supplied in step 308 (i.e., the user's name, e-mail address, gender and date of birth) is also requested in the forms for expanded information in step 312. Thus, upon filling in at least one field from the fill-out forms (step 316) presented in either step 308 or 312 the present invention field checks the user's unput for syntactically appropriate responses. Subsequently, in step 320, the user inputs a request to terminate entering information in the presently presented fill-out form(s) and in step 324 the user determines whether to enter additional information in either the basic registration information fill-out forms or the expanded information fill-out forms. If the user indicates that he/she desires to enter further registration information, then step 304 is again performed. Alternatively, the flowchart returns to the invoking program (flowchart) with the user supplied registration information.

Figure 4B:
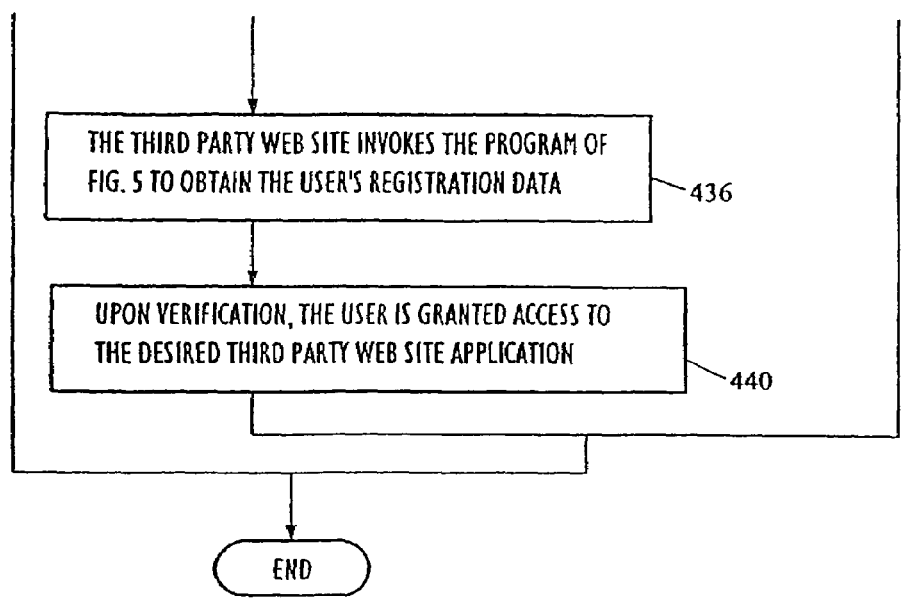

FIGS. 4A and 4B present a flowchart for the steps performed when the user accesses a present third party web site 116 cooperating with registrar, and in the process of registering at the third party web site the user is automatically put in contact with the registrar web site 100 so that registration information may be provided to registrar for registering the user at the present third party web site as well as other third party web sites that the user may request. Accordingly, assuming the user uses a WWW browser 120 to access a third party web site 116 as in step 404, the third party web site responds with a web site home page (step 408) typically having a registration fill-out form into which the user is requested to enter registration information. Note that the user may or may not be registered at this third party web site. Thus, if the user is registered, then he/she may only need to enter a user ID and optionally a password in order to gain access to a desired application at the third party web site. Further note that for different third party web sites 116, the user's identification (and optionally a password) may be different due to constraints on user ID (and password) syntax being different at different third party web sites. Further, such user IDs at different web sites may be different because a user ID requested by the user may already have been assigned to another user.

Subsequently, once the third party web site 116 has received a response from the user, a determination is made as to whether the user is registered at the web site (step 412). If the user is registered, then no further processing related to the present invention is required. Alternatively, if the user is not registered at the third party web site, then a response is transferred from the third party web site 116 through the World Wide Web 104 to the user's WWW browser 120 providing the user with the fill-out forms in which the user is requested to enter information for registering at the third party web site. Note that if the third party web site 116 is configured to accept user registration information from the present invention, then at least one fill-out form related to registering at the third party web site 116 will request information related to registering the user by using the present invention. In particular, the third party web site 116 may present the user with a fill-out form requesting the user to enter a user ID and optionally a password for the present invention (i.e., registrar) if the user is registered at the registrar web site 100. Additionally, the presented fill-out forms may request the user to indicate whether he/she prefers to register at the third party web site 116 by using registrar. Thus, assuming the user desires to register at the third party web site 116, a determination is made as to whether the user wishes to register using the present invention or register at the third party web site without using the present invention (step 416). If the user chooses to not use the present invention for registering at the third party web site 116, then the user explicitly supplies registration information for the present third party web site (step 420). Alternatively, if the user chooses to use registrar to register, then once the present third party web site 116 receives a response from the user indicating the choice to use registrar to register, in step 424, the present third party web site sends a request to the registrar web site 100 for registering the user at the registrar web site 100. Subsequently, in step 428 the steps of FIGS. 2A and 2B are performed for registering the user at the registrar web site 100. Subsequently, after registering at the registrar web site 100, in step 432, the user is automatically placed in contact with the present third party web site so that he/she submits a registration fill-out form to this third party web site 116: (a) indicating that the user's registration information may be obtained from the registrar web site 100; and (b) providing a user ID (and optionally a password) for the registrar web site 100 to be used as identification at the present third party web site. Following this, in step 436 the third party web site 116 invokes the program corresponding to FIG. 5 to obtain the user's registration data from the registrar web site 100. Lastly, upon verification by the third party web site 116 of the user's registration data, the user is granted access to the desired third party web site and/or application (step 440).

In FIG. 5, a flowchart is presented of the registration data transmission process from the registrar web site 100 to a third party web site 116. Accordingly, in step 504 the third party web site 116 provides the registrar web site 100 with identification of the third party web site, the user's registrar user ID and (any) registrar password. Further, in some instances, as will be described below, the third party web site 116 also supplies the registrar web site 100 with a return path to the user through the World Wide Web 104. Following this, in step 508, a determination is made by the registrar web site 100 as to whether the third party web site supplied information can be authenticated. If not all third party web site information is authenticated, then step 512 is encountered wherein a determination is made as to whether to request that the third party web site to resend the information of step 504. Note that such a determination may be made in one embodiment depending upon whether the third party web site identification is authenticated. That is, if the third party web site identification is authenticated, then a retry may be allowed. Otherwise, no retry may be allowed. Alternatively, referring again to step 508, if all information transmitted from the third party web site 116 is authenticated at the registrar web site 100, then step 516 is encountered. In this step, the program represented by FIG. 6 is performed for supplying the third party web site 116 with registration information related to the user from the user registration information database 144.

Figure 6B:
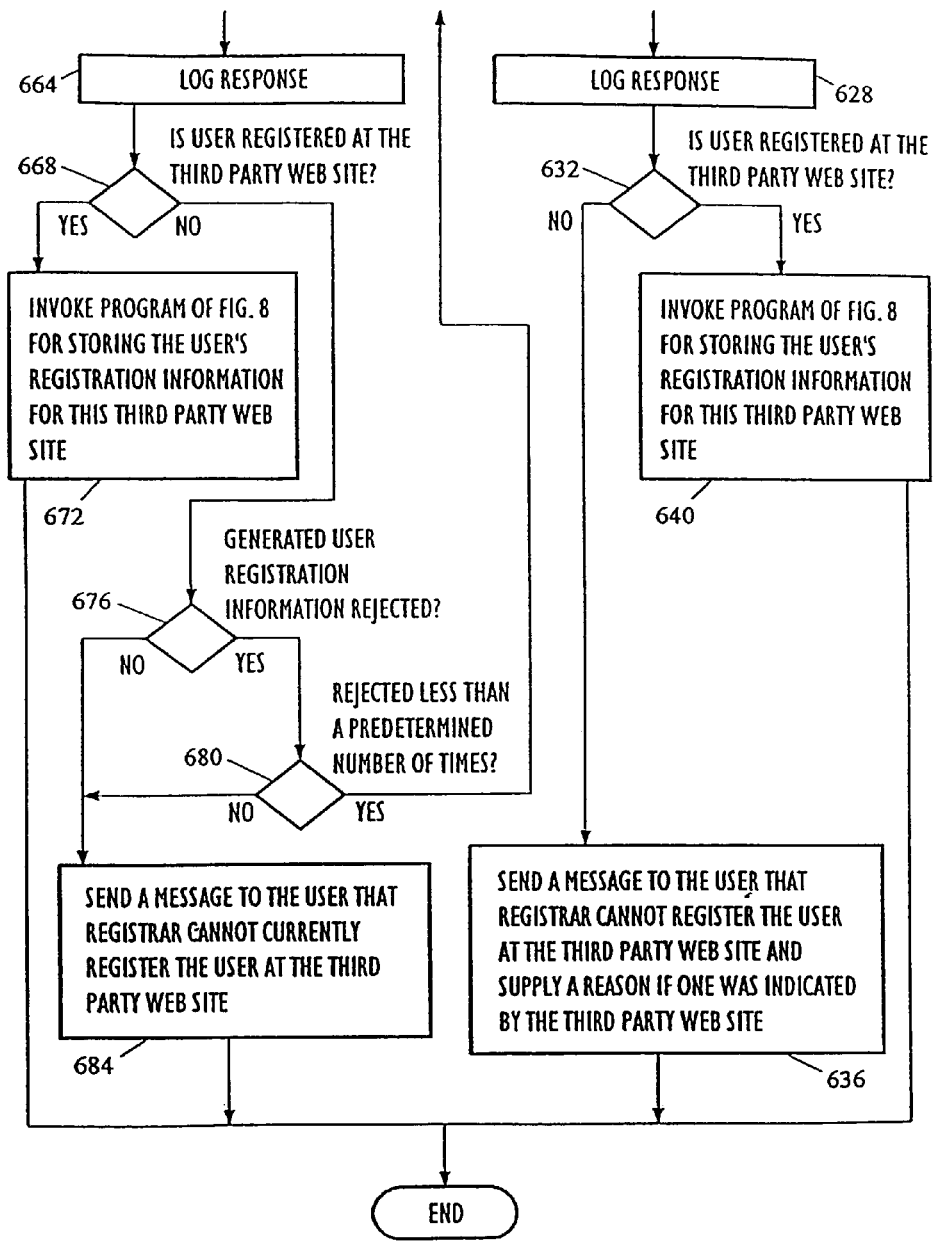

Referring now to FIGS. 6A and 6B, the flowchart presented here provides the steps for supplying a present third party web site 116 with registration information from the registrar web site 100, assuming that the present third party web site 116 has requested such information and that the request has been authenticated at the registrar web site 100. Accordingly, in step 604 the registrar web site 100 or, more precisely, a registrar application 128 performs the steps of FIG. 7 for retrieving the user registration information requested by the present third party web site 116 from the user registration information database 144. Note that a third party web site 116 may request various categories of information from the registrar web site 100 related to the user. In particular, a third party web site may request: (a) basic information as discussed in step 308 of FIG. 3; (b) expanded information as discussed in step 312 of FIG. 3; (c) custom information, wherein selected fields from the basic and expanded information are provided; and (d) proprietary information wherein one or more additional user related information items may be provided wherein these items have been obtained by the registrar web site 100 by, for example, enriching and verifying the registration information obtained from the user as in step 256 of FIG. 2B.

Following step 604, step 608 is encountered wherein a registration application 128 determines whether the present third party web site 116 requesting user information (for a user attempting to register at this third party web site) requires that a user ID (and optionally password) be generated specifically for this third party web site. That is, the third party web site 116 may require a user ID and/or password that conforms with a format peculiar to the third party web site 116. Note that to perform the step 608, in at least one embodiment of the present invention, information related to the requirements of the present third party web site 116 are stored at the registrar web site 100. In particular, the registrar web site 100 may store a user information request template for each third coordinating party web site 116 having access to user information at the registrar web site 100 such that a registrar application 128 (upon identifying a particular third party web site 116) may access a related user information request template for determining what information may be required by this third party web site.

If a user ID and optionally password need not be generated specifically for the requesting third party web site 116, then in step 612 the user information requested by the third party web site 116 is encrypted and in step 616 the encrypted information is sent to the third party web site. Following this, in step 620 a registrar application 128 logs an entry or a record in the registrar access log database 152 indicating that registration information for the user has been transmitted to the present third party web site 116. Subsequently, in step 624 a registrar application 128 (or, more precisely, an instantiation thereof) waits for an acceptance response from the present third party web site 116 to which the encrypted user information was sent. Note that the response from the present third party web site may include a third party web site specific user ID (and optionally password) if the user was not previously registered at this third party web site. That is, the third party web site may automatically generate at least a user ID if the user was not previously registered at the web site. Alternatively, it may be the case that the present third party web site uses the user's registrar registration user ID and password for registering the user at the third party web site 116. Note that in at least one embodiment for registration processing at a third party web site 116, the use of the registrar user ID does not create ambiguity in the identity of users registering at the third party web site. For example, a user seeking access to a cooperating third party web site may be required to indicate that his/her user ID and/or password is a registrar generated user ID (and/or password) so that the third party web site can process the entered user identification differently from that of users who have registered without using the present invention. Subsequently, when an acceptance response from the requesting third party web site 116 is provided to the registrar web site 100 (or, more precisely, a registrar application 128), this response is logged in the registrar access log database 152 in step 628. Following this latter step, in step 632, a determination is made as to whether the response from the present third party web site 116 indicates that the user is now registered at this third party web site. If no such indication is provided, then in step 636 a message is sent to the user at the user's WWW client node 108 that registrar cannot register the user at the present third party web site to which the user has requested registration and access. Further, the registrar application 128 performing step 636 may also supply the user with a reason as to why the user cannot register through registrar at the present party web site if such a reason was indicated by this third party web site when the response of step 624 was received.

Alternatively, if in step 632 it is determined that the user is registered at the present third party web site, then in step 640 the program corresponding to the flowchart of FIG. 8 is performed for storing at least the user's ID (and optionally password) for the present third party web site at the registrar web site 100 (more precisely, in the user registration information database 144) as will be discussed hereinbelow. Referring again to step 608 of FIG. 6A, if a registrar application 128 is required to generate a user ID (and optionally password) for the third party web site 116, then step 644 is next performed wherein a registrar application 128 generates a user ID (and optionally password) to be transmitted to the third party web site 116. Subsequently, the sequence of steps 648 through 668 are performed. Note that this sequence of steps is substantially the same sequence of steps as steps 612 through 632. However, the response from the present third party web site logged in step 664 may include an indication as to whether the user generated by the registrar application 128 is acceptable to the present third party web site 116.

Accordingly, continuing the discussion of FIGS. 6A and 6B from step 668, if the response from the present third party web site 116 indicates that the user is registered at the desired third party web site, then step 672 is performed wherein the program corresponding to the flowchart of FIG. 8 is again used to store the user's ID (and optionally password) for the present third party web site in the user registration information database 144 (as in step 640). Alternatively, if in step 668 it is determined that the user is not registered at the present third party web site 116, then in step 676 a determination is made as to whether the generated user registration information (i.e., user ID and optionally password) step 644 has been rejected by the present third party web site. If so, then in step 680 a determination is made as to whether this rejection has occurred less than a predetermined number of times (i.e., the sequence of steps 644 through 668 have been iteratively performed less than a predetermined number of times in attempting to register the user at the present third party web site). If the results of the test in step 680 is affirmative, then step 644 is again encountered for generating alternative user registration information for the present third party web site. Note that it is an aspect of the present invention that, at least in one embodiment, such generations produce user IDs that are meaningful to the user and/or are related to other web site registration user IDs for the user. Thus, in one embodiment of the present invention, the step 644 uses the user's registrar user ID as a "seed" from which to generate a user ID acceptable to the present third party web site 116. Moreover, note that the generation process of step 644 may use various heuristics and third party web site constraints to generate acceptable user IDs.

Alternately, if the negative branch from step 676 is followed, then the third party web site 116 may have rejected registering the user for any of a number of reasons that may not be able to be alleviated in a timely fashion so that the user can be registered at this third party web site in a short amount of time. Accordingly, step 684 is encountered wherein a message is transmitted to the user's WWW client node 108 indicating that registrar cannot currently register the user at the requested third party web site 116. Further, note that if in step 680 it is determined that too many attempts have been made to generate acceptable registration information for the third party web site, then step 684 is also encountered.

The flowchart of FIGS. 6A and 6B is representative of the processing variations within the scope of the present invention for supplying a third party web site with registration information. For instance, those skilled in the art will appreciate that steps 624 and 660 may have a timer associated with them whereby if there is no response from the third party web site within a predetermined time period, then a default response is provided by a registrar application 128 so that one of the steps 684 or 636 is performed as part of the processing when such a timer expires and subsequent steps in the flowchart are performed. Additionally, other steps may be inserted, for example, on the negative branch from step 676 wherein these additional steps attempt to address other anomalies indicated in the acceptance response received in step 660. For example, if the third party web site 116 requests additional user information than what was provided in step 648, then if this additional information is in the user registration information database 144 and the user has indicated that it is permissible to disseminate this information, then the additional information may be transmitted to the present third party web site 116. Also, in such a case, the transmittal of this additional information is recorded in the registrar access log database 152.

Referring now to FIG. 7, wherein the flowchart for a program is provided for supplying, from the user registration information database 144, a requesting third party web site 116 with registration information related to a particular user. Accordingly, in step 704 of FIG. 7, if the registrar web site 100 has not been previously supplied with an indication as to what type of information is required by the requesting third party web site, then a registrar application 128 constructs such a request to be transmitted to the requesting third party web site and subsequently the application may wait for a response from this third party web site. Following step 704, in step 708 it is assumed that the registrar web site 100 has been provided with an indication or specification as to what information the requesting third party web site desires. Thus, the registrar application 128 performing step 704 may now determine what registration information is to be transmitted to this third party web site. Note that at least in one embodiment of step 708, the user registration information requested may require validation according to the following criteria:

(1.1) The type and amount of registration information for a user that the user has indicated is available to be transmitted to a requesting third party web site.

(1.2) The type and amount of information the requesting third party web site 116 has contracted with the registrar web site 100 for transmitting regarding a particular user or category of users.

(1.3) The registration information available in the user registration information database 144.

Thus, as discussed with respect to step 604 of FIG. 6A, either basic, expanded, custom or proprietary registration information related to a user is transmitted to the requesting third party web site in step 736.

FIG. 8 presents a flowchart for storing, in the user registration information database 144, a user's ID and/or password for a third party web site 116 to which the user is registered using registrar. More precisely, the user ID and/or password for such a third party web site is stored via the steps of FIG. 8 if this information is different from the user's registrar user ID and/or password. That is, it is believed that for many third party web sites 116, the registrar user ID and password for users registered at the registrar web site 100 will be identical to the user's user ID and password at third party web sites. Note that there are significant advantages to third party web sites 116 using, for each registered user, the user's registrar user ID and password (or, some other user ID and password in common with other third party web sites to which the user is registered). For instance, a user is required to remember fewer user IDs and passwords associated with web sites and the web sites providing this convenience may have a higher volume of users accessing the web site due to the greater ease of access.

Regarding the steps of FIG. 8, in step 800 a determination is made as to whether the user has been provided with a user ID (optionally password) for the third party web site 116 (to which the user is attempting to register) that is different from the user's registrar user ID and/or password. If not, then there is nothing additional to store at the registrar web site 100 and the flowchart ends. Alternatively, if the decision of step 800 results in a positive answer, then step 804 is performed wherein the user's specific user ID and optionally password for this third party web site is stored with other user registration information in the user registration information database 144. Note the following advantages accrue by storing user registration information at the registrar web site: (a) each user has the convenience of off-site storage backup for each such third party web site to which the user is registered and (b) depending on the registration process at the third party web site, it may be expedient for such a web site (at least temporarily) to automatically contact the registrar web site 100 for retrieving, for example, the user's third party web site specific user ID upon subsequent user accesses to the third party web site.

Following step 804, in step 808 a determination is made as to whether the third party web site has indicated that it will initiate requests as in (b) immediately above. If so, then no further processing needs to be accomplished here in that the user may enter his/her user registrar web site 100 user ID (and optionally password) when accessing the third party web site. Alternatively, if step 808 yields a negative answer then step 812 is performed wherein the registrar web site 100 sends a message to the user at the user's WWW client node 108 providing the user with the ID (and optionally password) for the third party web site.

In an alternative embodiment of the present invention, a registrar registration module 156 may be provided at the user's WWW client node 108. This module (whether incorporated into the WWW browser 120 or external to the browser and communicating with the browser through, for example, a browser 120 port) may store locally at the client node 108 registration information for accessing third party web sites 116 to which the user has registered using the present invention. In FIGS. 9–13, flowcharts are provided for programs illustrating the processing of this alternative embodiment of the present invention.

In FIG. 9, a flowchart is presented of the program for registering at a third party web site 116 when the module 156 is installed on the user's client node 108.

Describing now the steps of FIG. 9, in step 904 the user sends a request to access a third party web site 116 via the user's WWW browser 120. Subsequently, upon receiving the request, the accessed third party web site 116 responds with a home page having a registration fill-out form (step 908). Assuming that the registration fill-out form allows the user to indicate that user registration information may be obtained locally at the client node 108, in step 912 the user indicates on the fill-out form that he/she desires to register at the third party web site and that his/her registration information can be retrieved using the registrar registration module 156 residing on the user's client node 108. Further note that the user may be required to activate or alert the module 156 so that this module can supply the appropriate user registration information to be communicated to the third party web site 116. Also note that the home page from the third party web site 116 may indicate the type of information required to register the user and this information may be used either manually or automatically for determining the user registration information stored on the user's client node 108 that will be transmitted to the third party web site. Subsequently, in step 916 the user specifies that the registration fill-out form is to be submitted to the third party web site. Accordingly, the WWW browser 120 communicates with the registrar registration module 156 to supply the registration information to the third party web site. That is, the processing performed here includes the steps of FIG. 10 which are described herein below. Subsequently, in step 920 a message is sent from the registration module 156 to the registrar web site 100 indicating that the user has registered at the third party web site and additionally supplying the registrar web site 100 with any user ID and password specific to the third party web site. Note that by sending this information as well as, for example, a copy of substantially all of the user's registration information stored locally to the registrar web site 100, the user is provided with an automatic off-site backup of his/her registration information. Additionally, the user may be provided with other advantages by providing his/her user registration information to the registrar web site 100. In particular, the registrar web site 100 may enrich the user's registration information with publicly available information on the user and alert the user to discrepancies between the user information and various publicly available records on the user.

Referring now to the flowchart of FIG. 10, this flowchart describes the steps performed when supplying a third party web site 116 with registration information retained by the registrar registration module 156 on the user's node. In step 1004, the steps of the flowchart of FIG. 7 are performed for retrieving the registration information requested by the third party web site. Subsequently, in step 1008 the registrar registration module 156 packages the accessed registration information for the third party web site together with the user's registrar ID (and optionally password) for transmittal to the third party web site. Subsequently, in step 1016 the registration information packaged together in step 1008 is encrypted so that in step 1020 this encrypted information may be sent securely to the third party web site via the World Wide Web 104. Following this, in step 1024 the module 156 logs an entry into a local log on the client node 108 indicating what registration information was sent to the third party web site. Subsequently, in step 1028 a process may be instantiated to wait for an acceptance response from the third party web site so that when such a response is obtained it may be logged locally at the client node 108 in step 1032.

In one embodiment of the present invention the user may configure the registrar registration module 156 to log all activities with third party web sites 116 and provide the records of this log to the registrar web site 100. This allows the registrar web site 100 or personnel that maintain the registrar web site 100 to analyze user activities on the World Wide Web 104. Such analysis may be useful to both registrar users and third party web site personnel in that, given a user's World Wide Web 104 activity, the registrar web site 100 may suggest additional third party web sites 116 of which the user may not be aware. Further, by analyzing the user access logs of registrar users, the registrar web site 100 may provide statistics to the third party web sites 116 as to the number and types of users accessing their respective web sites.

Figure 11B:
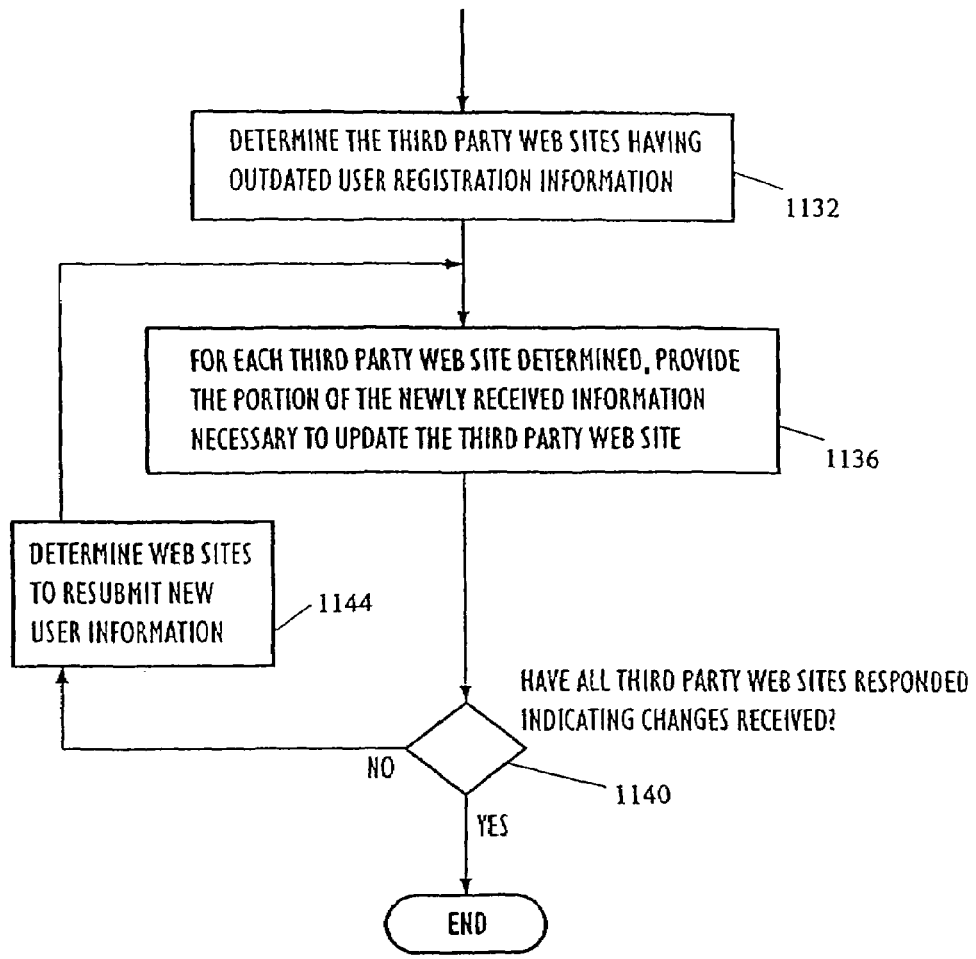

FIGS. 11A and 11B present a flowchart for the steps performed by the present invention when the user changes his/her registrar registration information. That is, the flowchart of FIG. 11 encompasses both the architecture or embodiment of the present invention wherein the user's registration information is stored substantially only at the registrar web site 100, and also the architecture or embodiment wherein the user's registrar information is also stored at the user's client node 108. Accordingly, in step 1104 a determination is made as to where the user's registration information is stored. Note that this step 1104 is unlikely to be explicitly performed by either the present invention or the user. Instead, the embodiment of the present invention determines which of the paths from this step to follow (i.e., if module 156 exists, then the "USER NODE" branch is followed; otherwise, the "REGISTRAR WEB SITE ONLY" branch is followed). Accordingly, assuming that the present invention is embodied such that the user's registration information is stored at the web site 100 only, then step 1108 is encountered wherein the user accesses the registrar web site 100 from his/her WWW client node 108 by entering his/her user ID and optionally password. Subsequently, in step 1112 the registrar web site 100 responds with a web page having a number of options related to the user's registration information and registrar web site 100 processing of this information. Note that such options include a request by the user to modify the user's registration information stored at the registrar web site. Additionally, other options may be also provided to the user including: (a) an option for requesting to be no longer affiliated with the registrar web site 100 and have all the user's registration information deleted; (b) an option for requesting to examine all information regarding the user stored at the registrar web site 100, including all information the registrar web site has obtained from publicly available sources; (c) a request for procedures and/or addresses to contact publicly available databases that registrar has accessed obtaining incorrect user information; and (d) third party web sites 116 that are providing information for a limited period of time and for which the user may be interested. Following step 1112, in step 1116 the user enters new information into an appropriate fill-out form received at the user's WWW client node 108 from the registrar web site 100. Note that this form is likely to be in a page different from the page of options described in step 1112. That is, upon submission of the page of options, the registrar web site 100 responds with a new page(s) having fill-out forms with the presently stored user registration information presented in the forms so that the user may change any of the fields on this page(s).

Note that in at least one embodiment of the present invention, the user is allowed to change his/her registrar user ID and/or password. However, it may be the case that when a user changes his/her registrar user ID, that the new requested user ID has already been assigned to another registrar user. Thus, the registrar web site 100 may respond with a request for further information (such as a request for a different user ID from the user) wherein when the user submits the additional information, the registrar web site 100 again checks to determine if the user is uniquely identifiable. Note that the loop of steps 1120 and 1124 are provided to represent the iterative process described here of changing the user's user ID. Further note that in some embodiments of the present invention, the registrar web site 100 may respond with alternative variations for a new user ID so that the user is not left to guess at a registrar user ID that is acceptable for uniquely identifying the user.

Returning now to step 1104, if the user's registration information is stored locally at the user's client node 108, then step 1128 is performed instead of the steps 1108–1124. However, for simplicity, a discussion of the processing performed in step 1128 is not described in detail here. Instead, a detailed discussion of this step is provided by FIG. 12 and the discussion of FIG. 12 hereinbelow for changing the registration information at the user's client node 108 and for transmitting the changes to the registrar web site 100.

Regardless of the branch of processing taken from step 1104, eventually step 1132 and the subsequent steps of FIG. 11B are encountered wherein the present invention updates or alerts third party web sites having previously received user registration information that this information may be outdated. Thus, the steps 1132–1140 are performed so that the registration information provided to such third party web sites via the present invention is consistent with the newly supplied user registration information. However, in at least one embodiment of the present invention, prior to providing any newly entered user registration information to the third party web sites, such information may be compared or correlated with publicly available information regarding the user that is, for example, accessible via certain third party web sites 116. Further, the user may request his/her newly entered registration information by supplied to only selected web sites to which the user is registered, or alternatively, the user may request that the newly entered registration information be supplied to all web sites to which the user is registered.

Figure 12B:
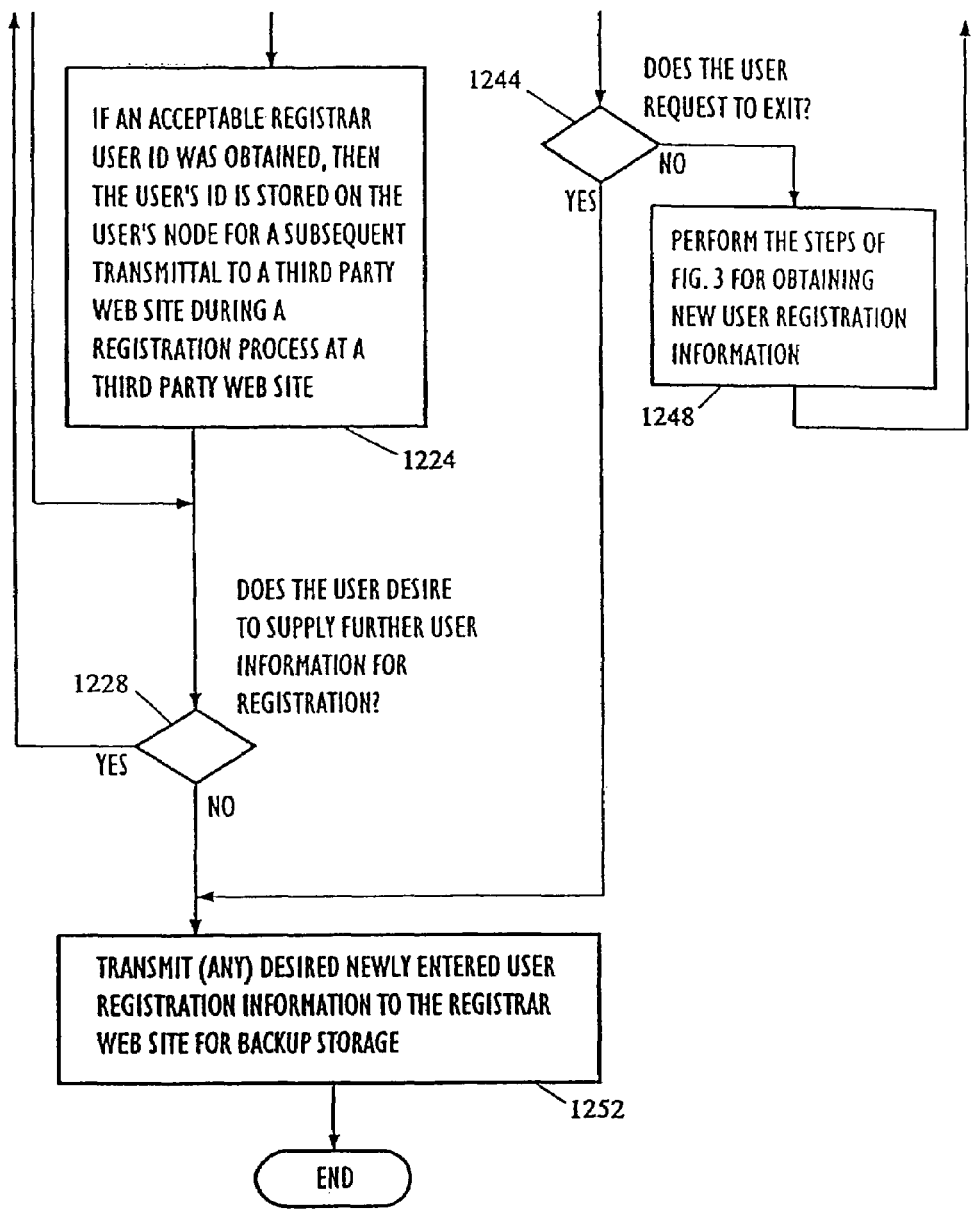
Figure 13B:
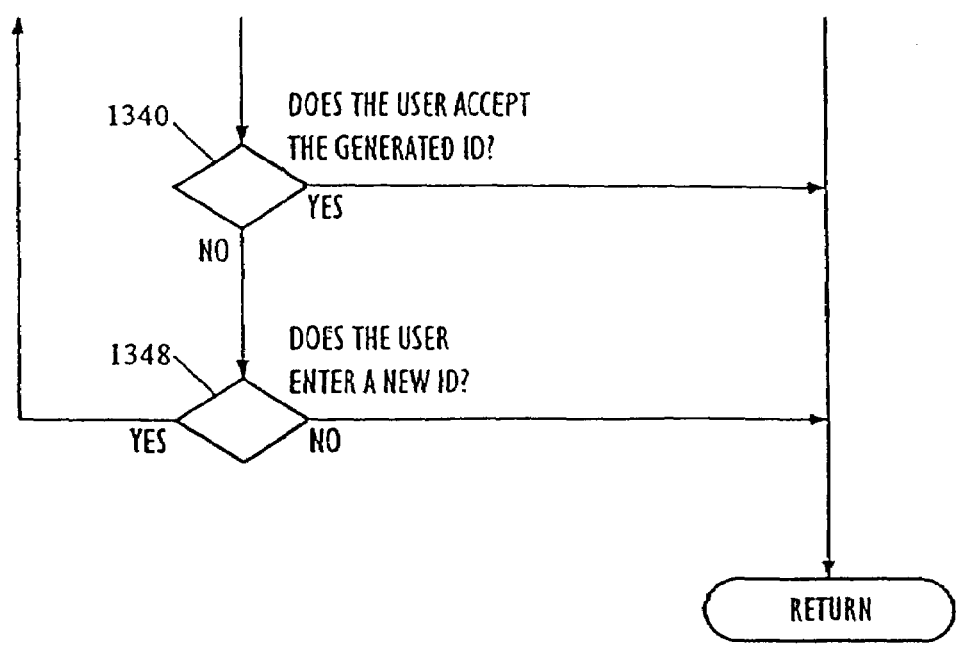

FIG. 12 presents a flowchart of the steps performed when the registrar registration module 156 is provided at the client node 108 and the user enters registration information into this module. Note that the steps of this flowchart may be performed when the user is entering registration information for registering the user with registrar, or when modifying registration information already supplied to registrar. Accordingly, in step 1204 the user requests activation of the registrar registration module 156 on the user's client node 108 for entering information that will subsequently be used for registering substantially automatically cooperating at third party web sites 116 requested by the user. Subsequently, in step 1208 the registrar registration module 156 on the user's client node 108 presents the user with one or more fill-out forms for the user to provide new registration information. Following this, in step 1212 a determination is made as to whether the user requests to obtain a registrar user ID. If so, then in step 1216 the program corresponding to the flowchart of FIG. 13 is performed to provide the user with a valid registrar user ID and optionally password. Subsequently, in step 1220 a determination is made as to whether the program of FIG. 13 returns a valid registrar user ID. If so, then step 1224 is performed wherein the new user's registrar ID is stored on the user's node 108 for a subsequent transmittal to a third party web site during a registration process at a third party web site that accepts the registrar user ID as the web site's ID. Subsequently, regardless of the path taken from step 1220, step 1228 is encountered wherein a determination is made as to whether the user desires to enter further user registration information.

If the user desires to enter further information, then step 1212 is again encountered and a determination is made once again as to whether the user requests to obtain a registrar user ID. However, it is important to note that the steps provided in this flowchart are only an indication of the processing provided by the registrar registration module 156 and the user's browser. In particular, since the user interfaces typically used by World Wide Web browsers allow a user to select the fill-out form fields to modify, the positive branch from step 1212 is taken only when the user enters information in a fill-out form field indicating that a registrar user ID is requested. Similarly, the negative branch from step 1212 is taken whenever user information is entered into other fill-out form fields unrelated to obtaining a registrar user ID.

Accordingly, if the user desires to enter other information than that required to obtain a registrar user ID, then from step 1212, step 1232 is encountered wherein the registrar registration module 156 explicitly requests the user's registrar registration user ID (and optionally password). Subsequently, in step 1236, assuming the user enters a registrar user ID, a determination is made as to whether the registrar user ID is valid. Note that this determination is initially made locally at the user's client node 108 without contacting the registrar web site 100. However, in one embodiment of the present invention, it is an option that if the registrar user ID entered is not found in the client node 108, then the registrar registration module 156 may inquire of the user as to whether he/she desires the registrar web site 100 to be interrogated for the registrar user ID and password and, if found, download to the user's registration information to the user's client node 108. If no valid registrar user ID is determined in step 1236, then the program ends in step 1240. Alternatively, if a valid registrar user ID is obtained, then in step 1244 a determination is made as to whether the user requests to exit the present program and thereby stop supplying registration information. Note that this step is similar to step 1212 in that if the user continues to enter registration information in fill-out form fields, then the negative branch from this step is followed and, alternatively, if the user, for example, activates an exit button on the user interface, then the positive branch from step 1244 will be followed. Accordingly, if the negative branch is followed, then in step 1248 the program of FIG. 6 is performed for obtaining new user registration information and, subsequently, step 1212 is encountered (or, more precisely, the user interface is provided that allows the user to request a registrar user ID).

Alternatively, if the positive branch is taken from step 1244, then step 1252 is encountered wherein the registrar registration module 156 transmits (or schedules the transmission of) any newly entered user registration information that the user desires to be transmitted to the registrar web site 100 for backup storage. Thus, in one embodiment of the present invention, the step 1252 provides the user with the option to discard the registration information provided in step 1248 above instead of transmitting this information to the registrar web site 100.

In FIG. 13, a flowchart is presented of the program for obtaining a registrar user ID and optionally password for the embodiment of the present invention wherein the registrar registration module 156 retains the user's registrar user ID (and optionally password) for automatically providing to third party web sites at which the user requests registration using the present invention. Accordingly, in step 1308 the registrar registration module 156 requests the user to select a registrar user ID and optionally a password that can be used to access the user's registration information at both the user's client node 108 and at the registrar web site 100. Assuming that the user enters a user ID and optionally password in step 1308, in step 1312 the registrar registration module 156 transmits the user selected ID and optionally password to the registrar web site 100. Subsequently, in step 1316 a determination is made by the registrar application 128 as to whether the user's selected user ID and optionally password are acceptable to the registrar web site. That is, a registrar application 128 accesses the user registration information database 144 to determine if the selected user ID is sufficiently unique. Note that other steps may be performed between steps 1308 and 1312. For example, the syntax for user IDs and optionally passwords may be checked at the module 156 prior to transmitting the user's selected registration information to the registrar web site 100.

Continuing with step 1316, a determination is made at the registrar web site 100 as to whether the user's selected user ID and optionally password are acceptable to registrar. If so, then in step 1320 a registration application 128 stores the user's ID and optionally password in the user registration information database 144. Note that since it is unlikely that any further information related to the present user is stored at the registrar web site, the process of storing the user's user ID and optionally password includes creating a new record in the database 144 and marking all remaining fields related to registration information for this user to indicate that these fields are as yet not valid. Following this, in step 1324 a registrar application 128 transmits a message to the user's WWW browser 120 indicating that the user's selected user ID and optionally password is acceptable to registrar.

Alternatively, if the negative path is taken from step 1316, then step 1336 is encountered wherein a registrar application 128 attempts to generate an acceptable user ID and optionally password as a substitute for the user's proposed user ID (and optionally password). Note that in generating alternative registration information, the registrar application 128 may use the user supplied information as the basis or "seed" for generating an acceptable user ID (and optionally password) to be transmitted back to the user. Accordingly, in step 1340, once the user is presented with the newly generated registration information on the user's client node 108, the registrar registration module 156 provides the user with the option to accept or reject the generated information. If the user accepts the generated registration information, then the flowchart ends. Alternatively, if the user rejects this information, then in step 1348 a further determination is made by the module 156 as to whether the user enters a new user ID (and optionally password) as an alternative to the generated registration information. If such new user registration information is provided, then step 1312 and steps thereafter are again performed in attempting to provide a registrar user ID (and optionally password) to the user. Alternatively, if the user indicates in step 1348 that no further proposed candidates for a user ID (and optionally password) will be forthcoming, then the flowchart ends without an acceptable registrar user ID being obtained.

The foregoing discussion of the invention has been presented for purposes of illustration and description. Further, the description is not intended to limit the invention to the form disclosed herein. Subsequently, variation and modification commensurate with the above teachings, within the skill and knowledge of the relevant art, are within the scope of the present invention. The embodiments described hereinabove are further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

The invention claimed is:

1. A computer readable medium containing a data structure for storing user registration information accessible by a registration web site, comprising:

at least one first data field for storing user registration information;

at least one second data field for storing a user identifier; and at least one third data field for storing a user password;

wherein the contents of the first, second and third data fields are provided by the registration web site to a third party web site in order to authenticate a user input directing the third party web site to perform a given action; and wherein the data structure is configured to facilitate the communication of the user registration information to the third party web site upon the third party web site communicating to the registration web site the user identifier and user password obtained from a user, and wherein the third party web site utilizes the received registration information to support the given action.

2. The computer readable medium of claim 1 wherein the given action further comprises a request to purchase and have physically delivered to a shipping address a good or service via the third party web site.

3. The computer readable medium of claim 1 wherein the given action further comprises a request to access a web page accessed via the third party web site.

4. A computer system for use in registering a user with one or more web sites comprising:

a network interface configured for use in establishing a network connection with a user client node; and a network server configured for executing a registrar application program, wherein the registrar application program includes instructions for configuring the server to obtain user registration information from the user, associate a user identifier and user password with the user registration information, and provide the obtained user registration information to at least one third party web site upon the third party web site obtaining from the user the user identifier and the user password, and providing the obtained user identifier and user password to the registrar application program, wherein the user identifier and user password are utilized by the registrar application program to authenticate a request from the third party web site for the user registration information.

5. The computer system of claim 4 wherein the registrar application program includes instructions for configuring the network server to save the user registration information in a database.

6. The computer system of claim 4 wherein the registrar application program includes instructions for configuring the network server to communicate, upon user permission, the saved user registration information to the at least one third party web site.

7. The computer system of claim 6 wherein the user permission is established by the at least one third party web site communicating to the network server a user identifier and password associated with the user registration information.

8. The computer system of claim 4 wherein the registrar application program includes instructions for configuring the network server to save the user registration information in a database local to the user client node.

9. The computer system of claim 4 wherein the registrar application program includes instructions for configuring the network server to save the user registration information in a database accessible to the network server.

10. The computer system of claim 4 wherein the registrar application program includes instructions instructing the network server to provide a copy of the registrar application program to the user client node; whereupon receipt of the registrar application program, the user client node executes the instructions provided in the registrar application program to obtain the user registration information.

11. The computer system of claim 10 wherein the registrar application program further includes instructions instructing the user client node to save the user registration information in a database.

12. The computer system of claim 11 wherein the database is accessible to the network server.

13. The computer system of claim 11 wherein the registrar application program further includes instructions instructing the user client node to communicate the user registration information to the at least one third party web site.

14. A method for facilitating the communication of information used to facilitate an on-line transaction by identifying a user to a node associated with an on-line merchant, comprising:

receiving, at a node having access to the information, from a node associated with an on-line merchant, a request for the information; wherein the request includes a user identifier and password provided by a user to the node associated with an on-line merchant; and communicating the information to the node associated with the on-line merchant, wherein the information includes at least basic, user registration information; wherein the user identifier and user password are utilized by the node having access to the information to authenticate a request from the node associated with an on-line merchant for the information.

15. The method of claim 14, wherein the information includes a shipping address.

16. The method of claim 14, wherein the a request is communicated directly from the node associated with an on-line merchant to the node having access to the information.

17. The method of claim 14, wherein the information includes information useful in monitoring web site usage.

18. A method for identifying a user to an on-line merchant, comprising:

communicating, from a first networked node associated with an on-line merchant to a second networked node associated with an on-line registration database containing user demographic information, a request for the user demographic information which includes a user identifier and a password, wherein the user identifier and password have been previously provided to the first networked node by a user; and in response to the request, receiving at the first networked node user demographic information communicated from the second networked node; wherein the second networked node can access at least one database storing user demographic information and wherein at least one of the first and second networked nodes are connected to the Internet; wherein the user identifier and user password are utilized by the second networked node to authenticate a request from the first networked node for the user registration information.

19. The method of claim 18 wherein the user demographic information includes a shipping address.

20. The method of claim 18, wherein the user demographic information saved by the second networked node is user accessible.

21. A method for communicating user information to one or more computers connected to the Internet, comprising:

receiving, at a server computer, identifying information from a user;

associating, at the server computer, at least one user identifier and password with the information;

upon a communication of the at least one user identifier from a user computer, associated with a user, to a merchant computer, associated with an on-line merchant, receiving at the server computer, from the merchant computer, a request for the information, wherein the request includes the user identifier provided by the user computer; and upon validation, by the server computer, of the user identifier received from the merchant computer, communicating the information from the server computer to the merchant computer; wherein user information received by the merchant computer facilitates an on-line transaction between the user and the on-line merchant.

22. The method of claim 21, wherein the information includes delivery information.

23. The method of claim 21, wherein the user identifier comprises an e-mail address associated with the user.

24. The method of claim 23, wherein the user identifier further comprises a user password.

25. A method for registering on-line a first party with a third party by obtaining registration information associated with the first party from a data store associated with a second party, wherein at least a portion of the registration information is provided, at least in part, by the first party to the second party and relates to one or more users; comprising:

receiving at the third party, from the first party, a user identifier and a password, wherein the user identifier and password are associated with registration information for the first party stored in the data store;

requesting by the third party, from the second party, the registration information wherein the request includes the user identifier and the password; and upon validation of the user identifier and password by the second party, receiving at the third party, from the second party, the registration information;

wherein each of the parties are associated with a node having an Internet address.

26. The method of claim 25, wherein the registration information received by the third party comprises a street address associated with the first party.

27. The method of claim 26, wherein the registration information further comprises demographic information useful in monitoring usage of at least one web site.

* * * * *